United States Patent [19]
Endo et al.

[11] Patent Number: 5,732,790
[45] Date of Patent: Mar. 31, 1998

[54] ELECTRIC POWER STEERING APPARATUS

[75] Inventors: Shuji Endo; Hiroyuki Kano; Hideaki Kawada, all of Maebashi; Yasuhiko Miyaura, Gunma-ken; Isamu Chikuma, Maebashi; Hiroshi Eda, Maebashi; Shozo Sekiya, Maebashi; Nobuyasu Ando, Takasaki; Kenichi Hayakawa, Maebashi, all of Japan

[73] Assignee: NSK Ltd., Tokyo, Japan

[21] Appl. No.: 562,897

[22] Filed: Nov. 27, 1995

[30] Foreign Application Priority Data

| | | | |
|---|---|---|---|
| Nov. 30, 1994 | [JP] | Japan | 6-319497 |
| Dec. 9, 1994 | [JP] | Japan | 6-330943 |
| Dec. 13, 1994 | [JP] | Japan | 6-308833 |
| Jan. 11, 1995 | [JP] | Japan | 7-018408 |
| Oct. 4, 1995 | [JP] | Japan | 7-257746 |

[51] Int. Cl.$^6$ ............................................. B62D 5/04
[52] U.S. Cl. ........................................ 180/444; 180/446
[58] Field of Search ........................... 180/443, 444, 180/445, 446

[56] References Cited

U.S. PATENT DOCUMENTS

| | | | |
|---|---|---|---|
| 4,874,053 | 10/1989 | Kimura et al. | 180/446 X |
| 5,029,659 | 7/1991 | Saito | 180/443 |
| 5,573,079 | 11/1996 | Suda et al. | 180/446 X |

FOREIGN PATENT DOCUMENTS

| | | |
|---|---|---|
| 0 351 087 | 1/1990 | European Pat. Off. . |
| 0 403 234 | 12/1990 | European Pat. Off. . |
| 0 535 422 | 4/1993 | European Pat. Off. . |
| 38 44 578 | 1/1989 | Germany . |
| 38 35 955 | 5/1989 | Germany . |
| 63-69671 | 5/1988 | Japan . |
| 4-27743 | 7/1992 | Japan . |
| 2 207 400 | 2/1989 | United Kingdom . |
| 2 226 285 | 6/1990 | United Kingdom . |
| 2 275 901 | 9/1994 | United Kingdom . |

*Primary Examiner*—Kevin Hurley
*Attorney, Agent, or Firm*—Shapiro and Shapiro

[57] ABSTRACT

In order to provide an electric power steering apparatus which can be made compact as well as reduced in cost and can be improved in reliability, a control circuit and a drive circuit are provided on a deformable flexible circuit substrate. The circuit substrate is provided on the housing of a reduction gear mechanism while being deformed so as to cover a portion of the outer surface of the housing along the shape of the outer surface.

5 Claims, 14 Drawing Sheets

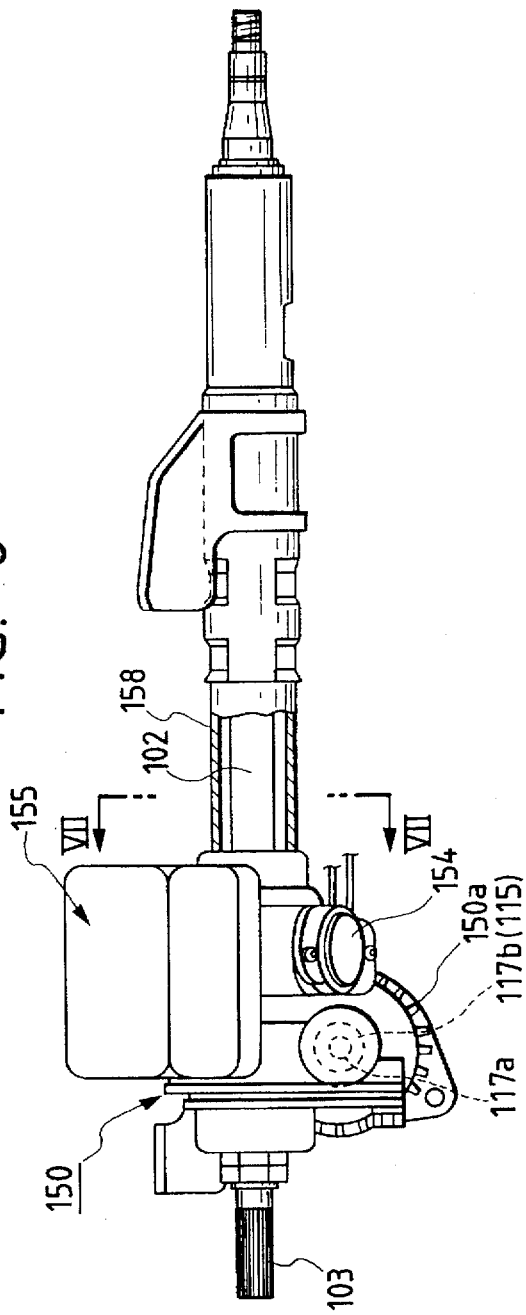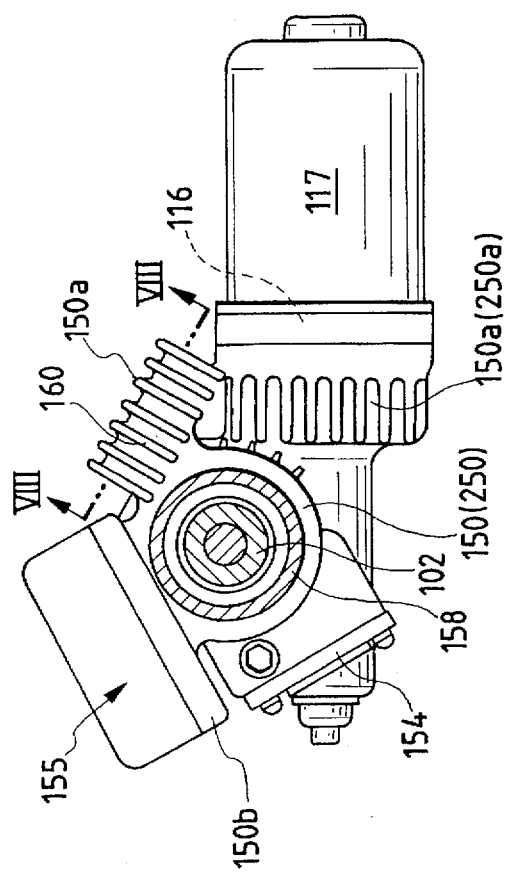

ELECTRIC POWER STEERING APPARATUS

BACKGROUND OF THE INVENTION

1. Field of the Invention

This invention relates to an electric power steering apparatus for use in a vehicle such as an automobile.

2. Related Background Art

As an electric power steering apparatus, there is known one provided with a steering torque detector for detecting a steering torque inputted to a steering system, an electric motor for imparting an auxiliary steering torque to the steering system, a control circuit for setting a current value to the electric motor on the basis of an output signal from the steering torque detector, and a drive circuit for supplying the electric motor with a driving current conforming to the set current value of the control circuit. The control circuit and the drive circuit are contained in a base plate containing case in the form of a rectangular parallellepiped disposed at a location far from the steering system.

However, when the base plate containing case is thus disposed at the location far from the steering system, the space in which the base plate containing case is disposed becomes the cause of hindering the downsizing of the apparatus.

So, there has been proposed an apparatus in which the control circuit and the drive circuit are disposed in a housing for a rack shaft which is one of members constituting the steering system, whereby the disposition space for the above-described base plate containing case is made unnecessary to thereby make the apparatus compact (see Japanese Laid-Open Utility Model Application No. 63-69671).

In such an electric power steering apparatus, the space in the housing for the rack shaft is limited and therefore, the control circuit and the drive circuit are separated from each other and disposed in spaced apart relationship with each other in the housing.

However, when the control circuit and the drive circuit are thus separated, not only a harness and a connector for connecting the circuits together become necessary, but also a base plate containing case is necessary for each of the circuits, and this leads to the problem of increased manufacturing costs. Also, due to the circuits being connected together by the harness and connector, factors which cause troubles (for example, the deterioration of the harness and connector, unsatisfactory connection, etc.) increase, and this leads to the reduced reliability of the apparatus.

Further, as an electric power steering apparatus, there is known an electric power steering apparatus of the rack and pinion type described, for example, in Japanese Utility Model Publication No. 4-27743. In this apparatus, a torque detector for detecting the steering torque of a pinion shaft connected to a steering wheel and a control circuit outputting a control signal on the basis of a torque detection signal obtained from the torque detector are disposed near the pinion shaft in a gear case supporting therein a rack shaft connecting the pinion shaft and the steering wheel together and on one side relative to the rack shaft. Also, a drive circuit for supplying an electric motor with an electric current conforming to a control signal from the control circuit is disposed on the other side relative to the rack shaft. The drive circuit is contained in a unit case which is integrally fixed to the gear case.

According to this electric power steering apparatus, the torque detector, the control circuit and the drive circuit are concentratedly disposed around the rack shaft and therefore, the wiring between the circuits becomes simple and the influence of noise is prevented and the reliability of the apparatus is improved. Also, when an electric current flows from the drive circuit to the electric motor, other circuitry disposed near the drive circuit may be thermally affected by the self-heating of a circuit element such as a power transistor, but since the torque detector and the control circuit are disposed on one side through the rack shaft and the drive circuit is disposed on the other side through the rack shaft, the torque detector and the control circuit are not affected by the heat from the drive circuit.

In the aforedescribed prior art, however, the area of contact is made small and the unit case is integrally fixed to the gear case and therefore, the quantity of heat generated in the self-heating circuit element in the unit case is not transferred to the gear case of large heat capacity, but is transferred to the unit case of small heat capacity, whereafter it is radiated from this unit case to the atmosphere. Thus, in the prior art, the quantity of heat generated by the circuit element cannot be efficiently radiated from within the unit case.

Therefore, the maximum electric current to be outputted to the electric motor may be limited by the temperature rise of the self-heating circuit element and further, the life of other circuit elements constituting the drive circuit may be remarkably reduced by the quantity of heat of the aforementioned circuit element. Thus, the circuit characteristic of the drive circuit is fluctuated by the quantity of heat of the self-heating circuit element and the supply of a predetermined electric current to the electric motor becomes impossible, whereby the assist characteristic of the electric power steering apparatus may be greatly fluctuated.

On the other hand, in the apparatus described in the aforementioned Japanese Laid-Open Utility Model Application No. 63-69671, a torque detector for detecting the transmission torque of a pinion shaft connected to a steering wheel and a control circuit outputting a control signal on the basis of a torque detection signal obtained from the torque detector are disposed near the pinion shaft in a gear case supporting therein a rack shaft connecting the pinion shaft and the steering wheel together and on one side relative to the rack shaft. Also, a drive circuit for supplying an electric motor with an electric current conforming to the control signal from the control circuit is disposed on the other side relative to the rack shaft in the gear case.

According to this electric power steering apparatus, the torque detector, the control circuit and the drive circuit together constituting a steering control device are concentratedly disposed around the rack shaft and therefore, the wiring between the circuits becomes simple and the influence of the noise is prevented and the reliability of the apparatus is improved. Also, the electric current supplied to the electric motor flows to the drive circuit and a heat generating element such as a power transistor generates heat and therefore, other circuits disposed near the drive circuit may be thermally affected, but since the control circuit and the torque detector are disposed in spaced apart relationship with each other with the rack shaft interposed therebetween, thermal influence on the control circuit and the torque detector decreases.

In the above-described prior art, however, a containing case containing therein all of the components of the drive circuit including the aforementioned heat generating element is directly mounted in the gear case and therefore, it is impossible that the quantity of heat generated by the heat generating element is efficiently radiated to the outside of the gear case.

Therefore, the maximum electric current to be outputted to the electric motor may be limited by the temperature rise of the heat generating element itself and further, the lives of other components constituting the drive circuit may be remarkably reduced by the quantity of heat generated by the heat generating element. Thus, the circuit characteristic of the drive circuit is subjected to heat fluctuation by the quantity of heat generated by the heat generating element and the supply of a predetermined electric current to the electric motor becomes impossible, whereby the assist characteristic of the electrically operated power steering apparatus may be greatly fluctuated.

As the electric power steering apparatus of a vehicle, there is known one designed such that the rotational output of an electric motor which provides an auxiliary steering torque is decelerated by a gear device and transmitted to the output shaft, e.g. the rack shaft, of a steering mechanism, and a manual force applied to a steering wheel is assisted to thereby reciprocally move the rack shaft within a predetermined range, thus effecting the steering of wheels. In such an electric power steering apparatus, provision is made of a construction in which a steering shaft connecting the steering wheel and the rack shaft together is divided into two portions, which are connected together by a torsion bar, and the angle of torsion of the torsion bar twisted by a torque applied to a steering shaft is converted into an axial amount and is measured by a potentiometer, whereby a steering torque is detected.

During the operation of such an electric power steering apparatus, an electric motor and a driver (including a resistor, etc.) for driving it generate heat, and this heat is conducted through a housing and arrives at the potentiometer which is a precision part, and though slightly, the zero point of the detection torque of the potentiometer may deviate by this heat. When the zero point of the potentiometer deviates, the detection output of the potentiometer varies and it may be recognized by mistake that a torque differing from the actual steering torque has been outputted, and an inappropriate auxiliary torque may be outputted.

In order to prevent the conduction of such heat, it would occur to mount the potentiometer on the housing through resin or like material of low heat conductivity, but mounting the potentiometer through resin which is an elastic material may result in the deviation of the zero point of the detection torque caused by vibration, deterioration, etc., and also leads to increased parts which in turn leads to increased costs.

As the electric power steering apparatus of a vehicle, there is further known one designed such that the rotational output of an electric motor which provides an auxiliary steering torque is decelerated by a gear device and transmitted to the steering shaft, e.g. the rack shaft, of a steering mechanism, and a manual force applied to a steering wheel is assisted to thereby reciprocally move the rack shaft within a predetermined range, thus effecting the steering of wheels. In such an electric power steering apparatus, a torque sensor and an ECU for driving a motor are connected together by a harness or the like, whereby the giving and receiving of an electrical signal between them is effected.

In such a prior-art electric power steering apparatus, however, a potentiometer which is a torque sensor and the ECU have been provided at optimum locations and therefore, an intermediate harness for connecting the two together has become necessary, and this has resulted in an increase in the number of parts and an increase in the number of assembling steps.

SUMMARY OF THE INVENTION

It is an object of the present invention to provide an electric power steering apparatus which can be made compact and can be reduced in cost and can be improved in reliability.

It is another object of the present invention to provide an electric power steering apparatus in which the quantity of heat generated by a circuit element in a control device can be positively radiated.

It is still another object of the present invention to provide an electric power steering apparatus which is simple in construction and can prevent increased costs and can be expected to operate accurately.

It is yet still another object of the present invention to provide an electric power steering apparatus which is simple in construction and can be decreased in the number of parts and the number of assembling steps.

In order to achieve such objects, the electric power steering apparatus of the present invention is provided with a steering torque detector for detecting a steering torque inputted to a steering system, an electric motor for imparting an auxiliary steering torque to the steering system through a reduction gear mechanism, a control circuit for setting a current value to the electric motor based on an output signal from the steering torque detector, and a drive circuit for supplying the electric motor with a driving current conforming to the current value set by the control circuit, and is characterized in that the control circuit and the drive circuit are integrally disposed on a deformable circuit substrate, and the circuit substrate is provided on a housing for members of the steering system or a housing for the reduction gear mechanism while being deformed so as to cover a portion of the outer surface of the housing along the shape of the outer surface.

According to the present invention, the control circuit and the drive circuit are integrally disposed on the circuit substrate, which is provided on the housing for members of the steering system or the housing for the reduction gear mechanism while being deformed so as to cover a portion of the outer surface of the housing along the shape of the outer surface and therefore, the downsizing of the apparatus is possible without separating the circuits from each other.

The electric power steering apparatus of another aspect of the present invention is an electrically operated power steering apparatus wherein an input shaft to which a steering torque is inputted from a steering wheel, an output shaft to which the steering torque is transmitted from the input shaft and an auxiliary steering torque transmitting mechanism for transmitting an auxiliary steering torque generated by the electric motor are contained in a housing, and a control device provided with electronic circuits such as a control circuit and a drive circuit and for controlling the driving of the electric motor and generating the auxiliary steering torque is disposed in a portion of the housing, characterized in that a self-heating circuit element of circuit elements constituting the circuits of the control device is integrally fixed to the wall surface of the housing directly or through a mounting plate formed of a material of high heat conductivity.

According to this aspect of the electric power steering apparatus of the present invention, a self-heating circuit element of the circuit elements constituting the circuits of the control device is integrally fixed to the wall surface of the housing directly or through the mounting plate formed of a material of high heat conductivity and therefore, the quantity of heat generated by the circuit element is positively transferred to the housing of great heat capacity directly or through the mounting plate. Thereby, the excessive temperature rise of the self-heating circuit element itself is prevented and the other circuit elements around this circuit element are not thermally affected.

The housing to which the quantity of heat has been transferred from the self-heating circuit element is large in the area of contact with the atmosphere and therefore, efficiently radiates the quantity of heat to the atmosphere.

In yet another aspect of the present inventions, the electric power steering apparatus of the present invention is an electrically operated power steering apparatus provided with torque detecting means for detecting a steering torque inputted to an input shaft through a steering wheel, an electric motor generating an auxiliary steering torque, a reduction gear contained in a gear housing for transmitting the auxiliary steering torque of the electric motor to an output shaft, and a control device for controlling the auxiliary steering torque of the electric motor in conformity with an output signal from the steering torque detecting means, characterized in that lubricating oil is enclosed in the gear housing to thereby render the reduction gear oil-bathed, a containing chamber communicating with the interior of the gear housing and having its internal space filled with the lubricating oil is provided at an outer peripheral position of the gear housing and a circuit element great in quantity of heat generation constituting a member of the control device is contained in the containing chamber.

According to this aspect of the electric power steering apparatus of the present invention, lubricating oil is enclosed in the gear housing and the reduction gear is rendered oil-bathed, and the meshing states of the output shaft and the output shaft of the electric motor with the reduction gear are always made smooth and therefore, it becomes possible for an auxiliary steering force conforming to the steering torque to be reliably transmitted to the output shaft.

At the same time, the lubricating oil is supplied so as to fill the internal space of the containing chamber and the circuit element that generates a great quantity of heat in the control device is contained in the containing chamber while being immersed in the lubricating oil and therefore, the influence of the heat generation is not imparted to the other circuit elements of the control device. The quantity of heat of the circuit element contained in the containing chamber contacts with the lubricating oil of large heat capacity and is thereby positively radiated to the lubricating oil and therefore, the excessive temperature rise of the circuit element is prevented.

The electric power steering apparatus of still another aspect of the present invention comprises:

a housing through which a steering shaft extends;

a motor mounted in the housing for auxiliarily driving the steering shaft;

a detector mounted in the housing for detecting a torque applied to the steering shaft; and driving means mounted in the housing for driving the motor in conformity with the torque detected by the detector;

the housing being formed with a fin for heat radiation near at least one of the motor and the driving means.

According to this aspect of the electric steering apparatus of the present invention, the fin for heat radiation formed in the housing radiates heat generated from the motor and the driving means to minimize the quantity of heat conducted to the detector through the housing, thereby eliminating the influence of the heat on the detector.

The electric power steering apparatus of yet another aspect of the present invention comprises:

a motor for auxiliarily driving a steering shaft for steering wheels;

a detector having a rotary shaft rotatable in conformity with a torque applied to the steering shaft and for detecting the amount of rotation of the rotary shaft to thereby detect the torque;

control means for controlling the motor in conformity with the torque detected by the detector;

the detector being integrally incorporated in the control means; and mounting means for rotatably mounting the control means about the rotary shaft of the detector.

According to this aspect of the electric power steering apparatus of the present invention, the detector is integrally incorporated in the control means and therefore, an intermediate harness for connecting the two together can be eliminated, whereby the number of parts and the number of assembling steps can be reduced.

BRIEF DESCRIPTION OF THE DRAWINGS

FIG. 6 is a view showing the external appearance of a housing according to the present invention.

FIG. 7 is a cross-sectional view taken along the line VII—VII of FIG. 6.

DESCRIPTION OF THE PREFERRED EMBODIMENTS

Figure 1:
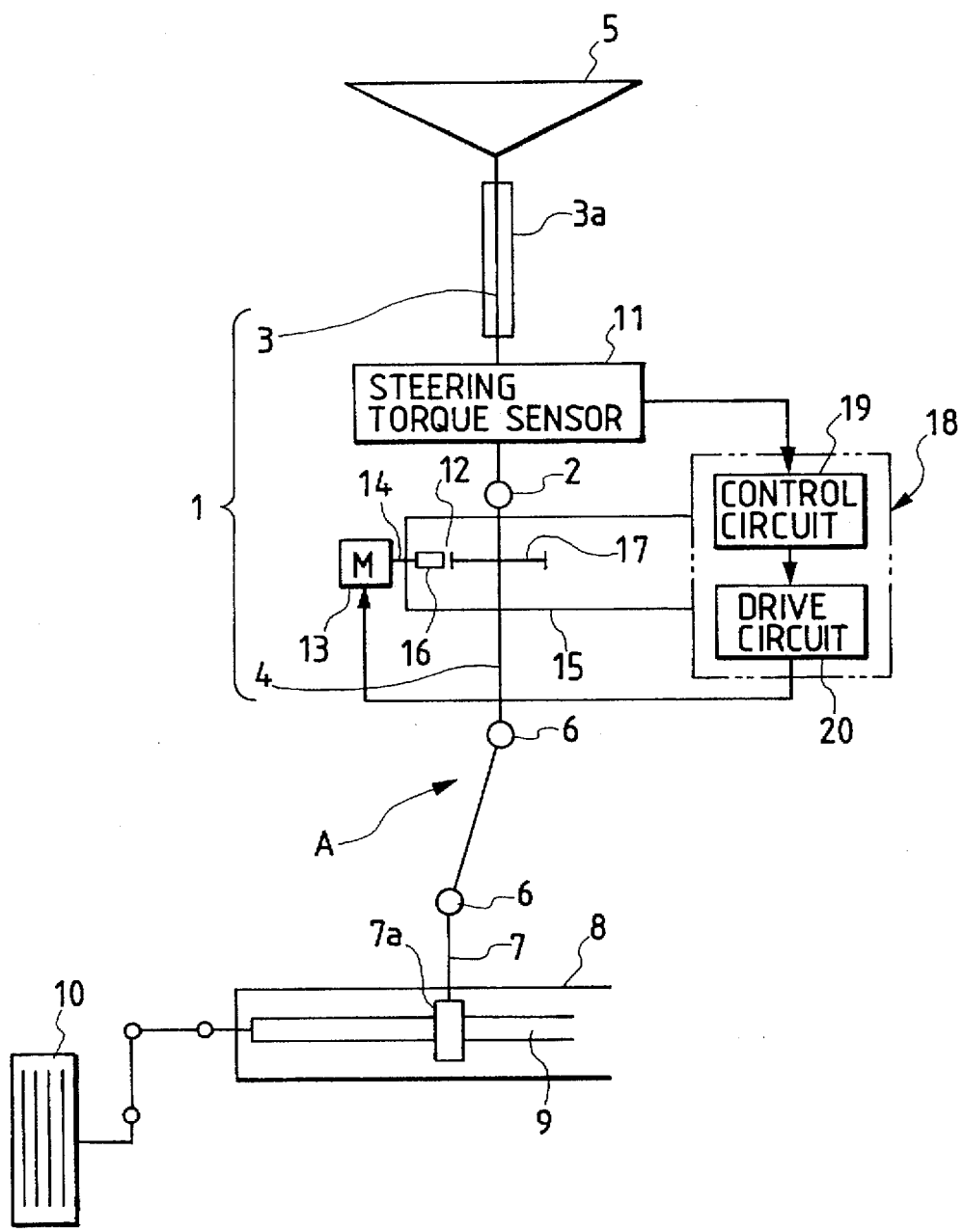
FIG. 1 is a schematic diagram for illustrating the basic construction of an electric power steering apparatus which is an embodiment of the present invention.
Figure 2:
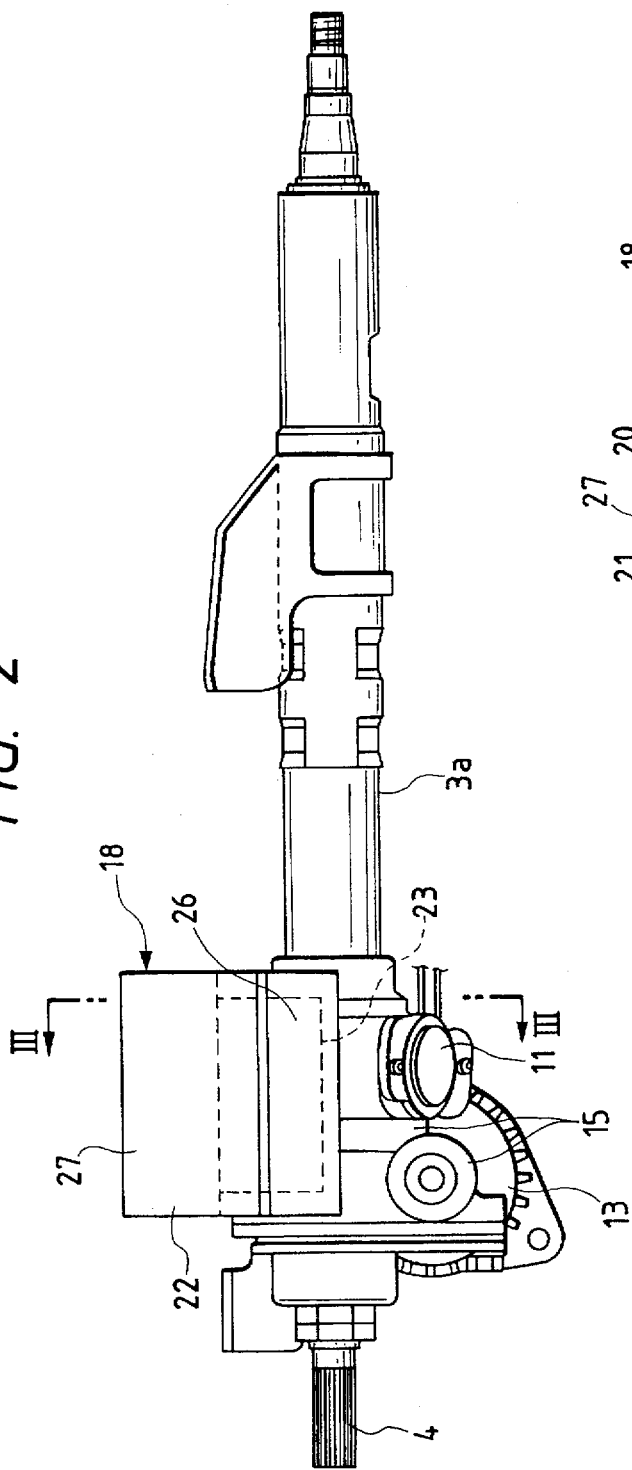
FIG. 2 is a detailed view of portions of FIG. 1.
Figure 3:
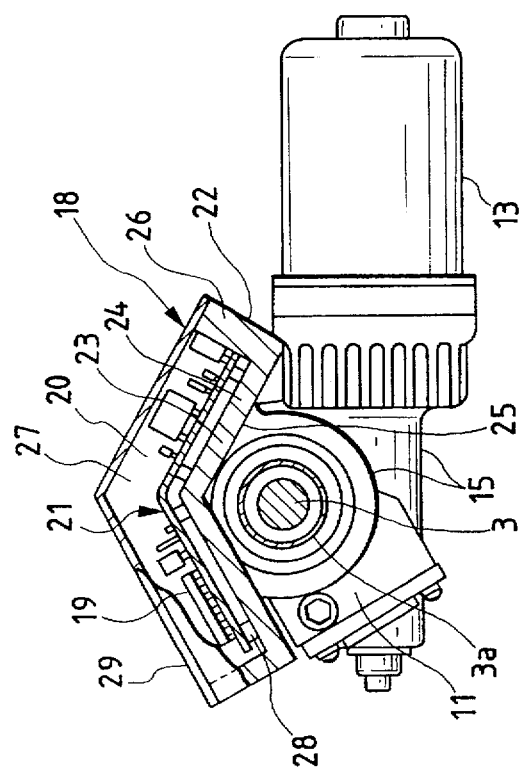
FIG. 3 is a cross-sectional view taken along the line III—III of FIG. 2.

Some embodiments of the present invention will hereinafter be described with reference to the drawings, FIG. 1 is a schematic diagram for illustrating the basic construction of an electric power steering apparatus which is an embodiment of the present invention, FIG. 2 is a detailed view of portions of FIG. 1, and FIG. 3 is a cross-sectional view taken along the line III—III of FIG. 2.

Referring to FIG. 1, the reference numeral 1 designates a steering shaft which is comprised of an input shaft 3 and an output shaft 4 connected together through a torsion bar 2. The input shaft 3 is inserted in a cylindrical input shaft housing 3a, and a steering wheel 5 is fixed to the upper end thereof. A pinion shaft 7 is connected to the lower end of the output shaft 4 through a universal joint 6. A pinion 7a provided on the lower end of the pinion shaft 7 is in meshing engagement with the teeth of a rack shaft 9 within a rack shaft housing 8. Accordingly, a steering force created by a driver steering the steering wheel 5 is transmitted to a turning (steered) wheel 10 through the input shaft 3, the torsion bar 2, the output shaft 4, the pinion shaft 7, the pinion 7a and the rack shaft 9.

In the present embodiment, the steering wheel 5, the input shaft 3, the output shaft 4, the torsion bar 2, the universal joint 6, the pinion shaft 7, the pinion 7a and the rack shaft 9 together constitute a steering system A. Also, in the present embodiment, the housing 3a for the input shaft 3 and a housing 8 for the rack shaft 9 form a housing for the members constituting the steering system A, whereas this is not restrictive, but a housing for other members may be provided.

A steering torque sensor 11 for detecting a steering torque inputted to the steering shaft 1 is provided on the input shaft 3. The steering torque sensor 11 outputs a steering torque detection signal conforming to the magnitude and direction of a torsion created in the steering shaft 1 by the driver steering the steering wheel 5.

The output shaft 4 is connected to the drive shaft 14 of an electric motor 13 through a reduction gear mechanism 12. This reduction gear mechanism 12 is provided with a worm 16 and a worm wheel 17 meshing with each other in a gear housing 15. The worm 16 is fixed to the drive shaft 14 of the electric motor 13, and the worm wheel 17 is fixed to the output shaft 4. The rotational force of the electric motor 13 may be transmitted to the output shaft 4 through the drive shaft 14, the worm 16 and the worm wheel 17. By such transmission of the rotational force, an auxiliary steering force is imparted to the output shaft 4 and the steering torque is decreased, whereby the driver's burden is mitigated. The rotational force of the electric motor 13 is controlled in conformity with the direction and magnitude of the steering torque being created in the steering system A.

In FIGS. 1 to 3, the reference numeral 18 designates a control device for controlling the rotational force of the electric motor 13 in conformity with the direction and magnitude of the steering torque being created in the steering system A.

The control device 18 is provided with a control circuit 19 and a drive circuit 20, and the basic operation thereof is as follows.

A current value to the electric motor 13 is set by the control circuit 19 based on a steering torque detection signal from the steering torque sensor 11, and the drive circuit 20 supplies the electric motor 13 with a driving current conforming to the set current value, whereby a rotational force conforming to the direction and magnitude of the steering torque being created in the steering system A is created in the drive shaft 14 of the electric motor 13, and this rotational force acts as an auxiliary steering torque on the output shaft 4.

The control circuit 19 and the drive circuit 20, as shown in FIG. 3, are disposed on a deformable flexible circuit substrate 21 which is contained in a substrate containing case 22 provided integrally with the gear housing 15 for the reduction gear mechanism 12. The substrate containing case 22 has its bottom plate 23 formed into an angled cross-sectional shape (see FIG. 3), and is provided so that the back surface 25 of the ridgeline portion 24 of the bottom plate 23 may cover a portion of the outer surface of the gear housing 15 along the shape of said outer surface. Over the entire marginal edge of the bottom plate 23, a side wall 26 is formed upright relative to the bottom plate 23, and a containing space 27 for the flexible circuit substrate 21 is formed in the space surrounded by the bottom plate 23 and the side wall 26. In the present embodiment, the bottom plate 23 and side wall 26 of the substrate containing case 22 are formed integrally with the gear housing 15, but this is not restrictive. For example, the bottom plate 23 may be fixed to the gear housing 15 as by bolts or welding.

The flexible circuit substrate 21 has its central portion bent and has its cross-sectional shape formed into substantially the same as the bottom plate 23, and is supported in parallelism to the bottom plate 23 by a support member 28. Thus, the flexible circuit substrate 21 is provided so as to cover a portion of the outer surface of the gear housing 15 along the shape of said outer surface. The upper opening portion of the containing space 27 is adapted to be removably covered by a lid portion 29. The lid portion 29 has its cross-sectional shape formed into substantially the same shape as the bottom plate 23, and has its marginal edge portion fixed to the upper end surface of the side wall 26 by screws for example.

In such an electric power steering apparatus, the substrate containing case 22 is provided integrally with the gear housing 15 disposed in proximity to the steering system A and the flexible circuit substrate 21 is contained in the substrate containing case 22 and therefore, the space in which the substrate containing case is disposed at a location far from the steering system A as in the prior art becomes unnecessary and moreover, the flexible circuit substrate 21 is bent and disposed so as to cover a portion of the outer surface of the gear housing 15 along the shape of said outer surface and the substrate containing case 22 in which the flexible circuit substrate 21 is contained is formed along the shape of the circuit substrate 21, whereby it is possible for the substrate containing case 22 not to protrude from the gear housing 15 and occupy a great deal of space and therefore, the substrate containing case 22 becomes compact and the downsizing of the apparatus can be effectively achieved.

Also, the control circuit 19 and the drive circuit 20 are disposed on the same circuit substrate 21 and therefore, a harness and a connector for connecting the control circuit 19 and the drive circuit 20 together which have heretofore been necessary becomes unnecessary and moreover, a single substrate containing case 22 for containing the control circuit 19 and drive circuit 20 therein is only required and thus, the manufacturing costs can be greatly curtailed as compared with the prior art.

Further, since the harness and connector for connecting the control circuit 19 and the drive circuit 20 together become unnecessary, factors causing troubles or the like (for example, the deterioration of the harness and connector, unsatisfactory connection, etc.) do not increase as has been experienced in the prior art and therefore, the high reliability of the apparatus can be maintained well.

In the above-described embodiment, the flexible circuit substrate 21 is disposed on the outer surface of the gear housing 15, but instead, the flexible circuit substrate 21 may be disposed on the outer surface of the rack shaft housing 8 or the input shaft housing 3a in a similar manner. However, the steering torque sensor 11 and electric motor 13 connected to the control device 18 are disposed near the gear housing 15 and therefore, it will be more effective for the connection of the flexible circuit substrate 21 if the flexible circuit substrate 21 is disposed in the gear housing 15.

Also, in the above-described embodiment, the flexible circuit substrate 21 is adopted as a deformable circuit substrate, whereas this is not restrictive, but use may be made of any deformable circuit substrate.

Further, in the above-described embodiment, the electric motor 13 is connected to the output shaft 3 through the reduction gear mechanism 12, but instead, the electric motor 13 may be connected to the pinion shaft 7 through the reduction gear mechanism 12. In this case, the flexible circuit substrate 21 is disposed in the gear housing 15 disposed on the pinion shaft 7.

As is apparent from the foregoing description, according to the present invention, the downsizing of the apparatus is possible without separating the control circuit and the drive circuit from each other and therefore, the manufacturing costs can be reduced and the reliability of the apparatus can be maintained as well.

Figure 4:
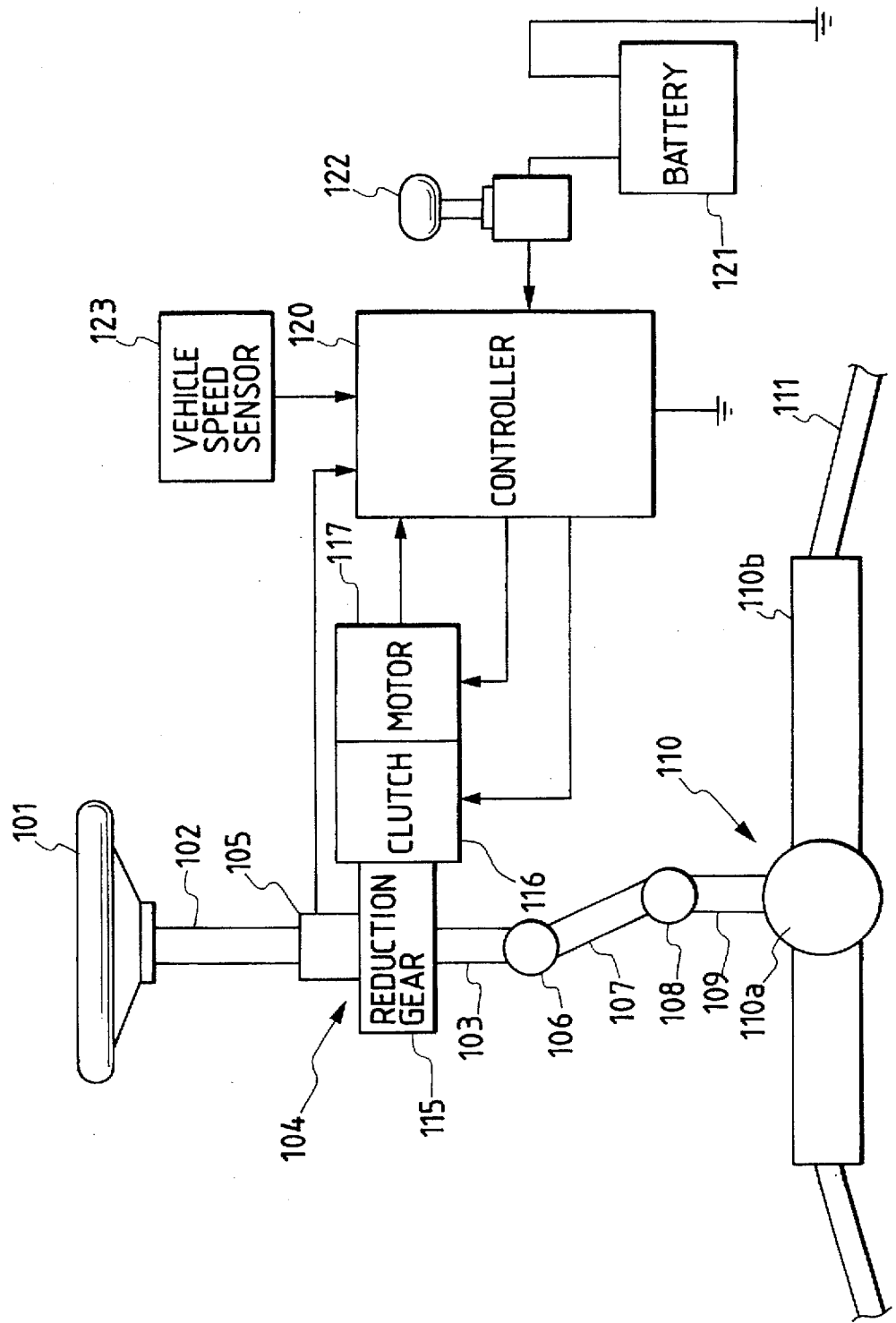
FIG. 4 is a schematic diagram showing an embodiment of the present invention.

FIG. 4 is a schematic diagram showing the construction of an embodiment of an electric power steering apparatus of the column assist type according to the present invention.

In FIG. 4, the reference numeral 101 designates a steering wheel, and a steering torque acting on this steering wheel 101 is transmitted to a steering shaft 104 comprised of an input shaft 102 and an output shaft 103 connected coaxially with the input shaft 102. A torsion bar 151 (see FIG. 10) which will be described later is twistably connected between the input shaft 102 and the output shaft 103, and a torque sensor (torque detecting means) 105 detects the torsional displacement of the torsion bar 151.

Also, the steering torque transmitted to the output shaft 103 is transmitted to a lower shaft 107 through a universal joint 106 and is further transmitted to a pinion shaft 109 through a universal joint 108. Also, the steering force transmitted to the pinion shaft 109 is transmitted to a tie rod 111 through a steering gear 110 to turn a turning wheel. The steering gear 110 is comprised of a rack and pinion gear having a pinion 110a and a rack 110b, and rotational motion transmitted to the pinion 110a is adapted to be converted into rectilinear motion by the rack 110b.

Also, the output shaft 103 has connected thereto a reduction pear (auxiliary steering torque transmitting mechanism) 115 for transmitting to the output shaft 103 an auxiliary steering torque transmitted from a motor (electric motor) 117 which will be described later. A motor 117 comprised, for example, of a DC servo electric motor for generating an auxiliary steering torque is connected to the reduction gear 115 through an electromagnetic clutch device (hereinafter referred to as the clutch) 116 comprised, for example, of an electromagnetic type for effecting the transmission and disconnection of the auxiliary steering torque. The clutch 116 has a solenoid, and an exciting current is supplied to this solenoid by a controller (control device) 120 which will be described later, whereby the reduction gear 115 and the motor 117 may be mechanically connected together, and the reduction gear 115 and the motor 117 may be disconnected from each other by the stopping of the supply of the exciting current.

Figure 5:
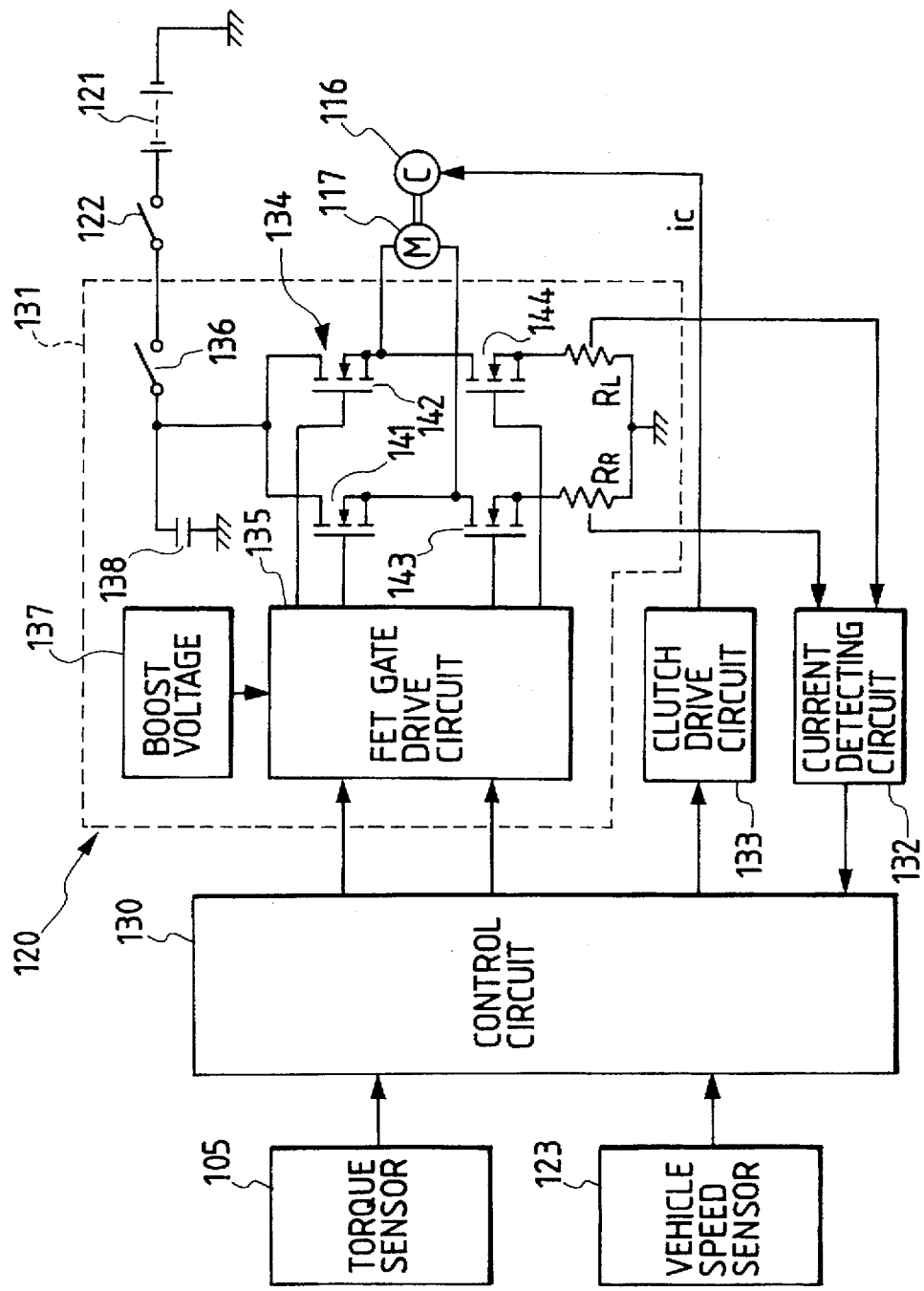
FIG. 5 is a block diagram of a control device according to the present invention.

The controller 120, as shown in the block diagram of FIG. 5, is comprised of an electronic circuit having a control circuit 130, a motor drive circuit 131, a current detecting circuit 132 and a clutch drive circuit 133, and effects the drive control of the motor 117 on the basis of a torque detection signal from the torque sensor 105 and a vehicle speed detection signal from a vehicle speed sensor 123 and also, connects or disconnects the output shaft of the motor 117 and the reduction gear 115 by the control of the clutch 116.

Although not shown, the control circuit 130 is provided with a microcomputer, an A/D converter, a counter, etc. The microcomputer is provided with an interface portion for effecting the inputting and outputting processes with an outside connecting instrument, and memory portions such as ROM and RAM. Also, the A/D converter is provided with an A/D converter for converting the torque detection signal inputted from the torque sensor 105 into a digital value and outputting it as a torque detection value to the microcomputer, and an A/D converter for converting the current detection signal of the motor 117 obtained from the current detecting circuit 132 and outputting it to the microcomputer. Also, the counter is a device to which a pulse signal is inputted from the vehicle speed sensor 123 such as an rpm sensor generating a pulse signal in conformity with the rotation of the output shaft of a transmission, not shown, and which integrates the pulse number per unit time and outputs it as a vehicle speed detection value to the microcomputer.

The motor drive circuit 131 is provided with an H bridge circuit 134, an FET gate drive circuit 135, a fail relay 136, a boost voltage source 137, etc. The H bridge circuit 134 has four FETs (circuit elements) 141 to 144 such as N channel MOS type FETs of the enhanced type (field effect transistors), and among them, the FETs 141 and 143 are connected in series with each other and the FETs 142 and 144 are also connected in series with each other, and these series circuit are connected in parallel with each other and the drain sides of the FETs 141 and 142 are connected to a battery 121 through the fail relay 136 and an ignition switch 122. A motor 117 is connected between the junction between the FETs 141 and 143 and the junction between the FETs 142 and 144. The source side of the FET 143 is grounded through a rightward current detecting resistor $R_R$ and likewise, the source side of the FET 144 is grounded through a leftward current detecting resistor $R_L$. The gate terminals of these FETs 141 to 144 are connected to the FET gate drive circuit 135 so that when the supply of a predetermined voltage is effected from the FET gate drive circuit 135 to each gate terminal, the corresponding FETs 141 to 144 may be rendered conductive. The fail relay 136 is a relay switch having a normally open contact, and ON/Off-controls the supply power source of the battery 121 to the H bridge circuit 134. The boost voltage source 137 is an integrated circuit which maintains the voltage supplied to the H bridge circuit 134 constant, and for example, an IC voltage regulator is used as the boost voltage source 137. Further, in FIG. 5, the reference numeral 138 designates a charging and discharging capacitor for primarily storing the voltage of the battery 121 therein.

Also, the current detecting circuit 132 effects for example, the amplification of a voltage produced across the rightward current detecting resistor $R_R$ and the leftward current detecting resistor $R_L$ and the elimination of noise, and outputs a rightward motor current detection signal and a leftward motor current detection signal to the control circuit 130. Further, the clutch drive circuit 133 controls the clutch 116 in conformity with a clutch control signal from the control circuit 130, supplies an exciting current to the solenoid of the clutch 116 and controls the mechanically connected and disconnected states of the output shaft of the motor 117 and the reduction gear 115.

FIGS. 6 to 10 show the external appearance and internal structure of a housing in the present invention.

Figure 10:
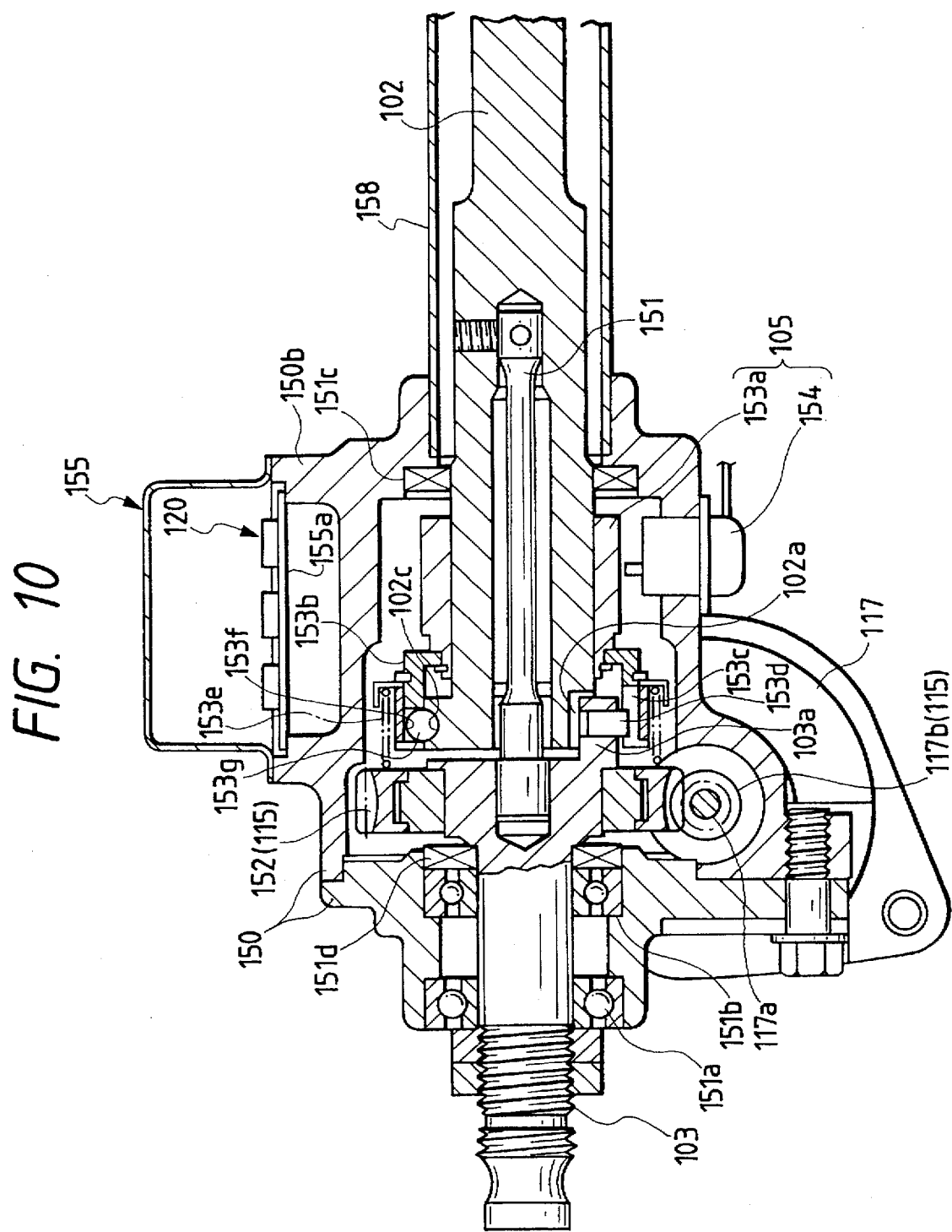
FIG. 10 is a cross-sectional view of principal portions showing the interior of the housing according to the present invention.

As shown in FIG. 10, the connecting portion between the input shaft 102 and the output shaft 103 disposed on the same shaft is contained in a gear housing 150, and the input shaft 102 is disposed in a cylindrical column housing 158 fixed to the gear housing 150. As shown in FIGS. 6 and 7, the gear housing 150 has a number of cooling fins 150a provided on the outer periphery thereof. This gear housing 150 corresponds to the housing of the present invention.

As shown in FIG. 10, a mounting portion 150b on which a sensor cover 155 is removably mounted is formed integrally with the gear housing 150, and the motor 117 having its motor shaft 117a facing in a direction orthogonal to the axis of the input shaft 102 (or the output shaft 103) is connected to the gear housing 150. The clutch 116 is contained in the gear housing 150 side with respect to the motor 117.

Figure 8:
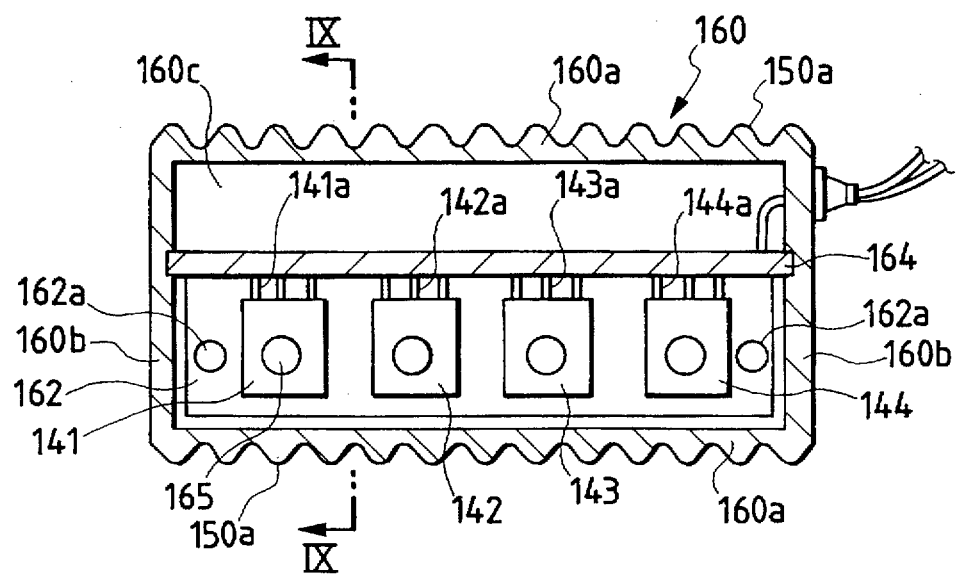
FIG. 8 is a cross-sectional view taken along the line VIII—VIII of FIG. 7 and showing a state in which a self-heating circuit element according to the present invention is fixed to the wall surface of the housing.
Figure 9:
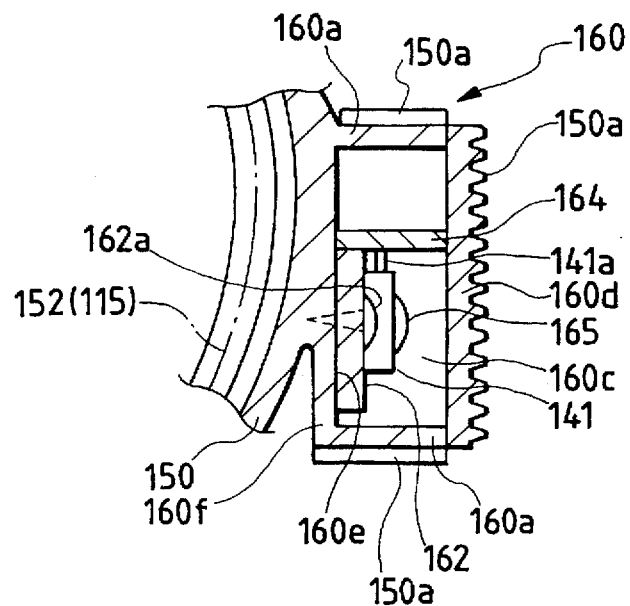
FIG. 9 is a cross-sectional view taken along the line IX—IX of FIG. 8.

A box-like heat generating element containing portion 160 is formed on the outer periphery of the gear housing 150 which is adjacent to the sensor cover 155. This heat generating element containing portion 160, as shown in FIGS. 8 and 9, has a rectangular containing chamber 160c defined by side plates 160a and 160b protruding from the outer periphery of the gear housing 150 and formed integrally with each other. A top plate 160d is attached to the side plates 160a and 160b so as to cover the opening portion of the containing chamber 160c, whereby the heat generating element containing portion 160 is formed. On the outer walls of the side plate 160a and the top plate 160d over the substantially whole area thereof, there are formed cooling fins 150a for making the area of contact with the atmosphere large.

Also, in the gear housing 150, as shown in FIG. 10, the output shaft 103 rotatably supported in the gear housing 150 through bearings 151a and 151b and the input shaft 102 rotatably supported in the gear housing 150 through bearings, not shown, are disposed on the same shaft in abutting relationship with each other. A convex portion 103a protruding toward the input shaft 102a is formed at a circumferential predetermined location on that end edge portion of the output shaft 103 which is adjacent to the input shaft 102, and this convex portion 103a is inserted in a longitudinal groove 102a wider than the convex portion 103a formed on the outer peripheral surface of that end portion of the output shaft 103 which is adjacent to the input shaft 102, whereby relative rotation of a predetermined angle or greater between the input shaft 102 and the output shaft 103 is prevented.

A worm wheel 152 coaxial and rotatable with the output shaft 103 is fitted on the outer periphery of the output shaft 103. A worm 117b is coaxially secured to the motor shaft 117a of the aforementioned motor 117, and this worm 117b is in meshing engagement with the worm wheel 152. Thus, the direction of rotation of the electric motor 117 is suitably changed over, whereby an auxiliary steering torque in any direction may be imparted to the output shaft 103 through the worm wheel 152 and worm 117b constituting a reduction gear 115.

The torque sensor 105, as shown in FIG. 10, is comprised of a slider 153a for varying the torsional displacement of the torsion bar 151 contained in the gear housing 150 as axial movement, and a potentiometer 154 outputting a torque detection signal comprising an analog voltage conforming to the movement of the slider 153a.

That is, the cylindrical slider 153a relatively displaceable in the axial direction and the direction of rotation is fitted on the input shaft 102, the end portion of a cylindrical cross guide 153b proximate to the convex portion 103a is coupled to the left end portion of the slider 153a, a longitudinal groove 153c long in the axial direction is formed in that portion of the inner peripheral surface of the cross guide 153b which is opposed to the convex portion 103a, and the outer end of a pin 153d having its inner end pressed against the convex portion 103a and protruding diametrally outwardly is inserted in the longitudinal groove 153c. Thereby, the output shaft 103 and the slider 153a are integral with each other in the direction of rotation, but are relatively displaceable in the axial direction within the range of the length of the longitudinal groove 153c. The slider 153a is normally biased rightwardly as viewed in FIG. 10 by a spring 153e, but the axial movement of the slider 153a is restricted because a ball 153g rollably contained in a recess 153f formed in the inner peripheral surface of the cross guide 153b circumferentially spaced apart by about 180° from the longitudinal groove 153c is also in a circumferentially continuous groove 102c formed in the outer peripheral surface of the left end side of the input shaft 102. The groove 102c is somewhat inclined with respect to the shaft and therefore, when relative rotation takes place between the input shaft 102 and the output shaft 103 while being accompanied by the torsion of the torsion bar 151 and the position of the slider 153a in the direction of rotation relative to the input shaft 102 changes, the ball 153g axially moves along the groove 102c, whereby the slider 153a axially moves.

The potentiometer 154 fixed to the gear housing 150 is connected to the control circuit 130 of a circuit substrate 155a fixed to the gear housing 150. Torsional displacement created in the torsion bar 151 by the steering wheel 101 being steered is outputted to the control circuit 130 as the torque detection signal of an analog voltage conforming to the amount of axial movement of the slider 153a.

In the mounting portion 150b of the gear housing 150, the circuit substrate 155a is mounted, and all the circuit elements constituting the control circuit 130, the current detecting circuit 132 and the clutch drive circuit 133 constituting the controller 120 shown in FIG. 5 are contained, and as regards the motor drive circuit 131, circuit elements except the four FETs 141 to 144 constituting the H bridge circuit 134 are contained.

The FETs 141 to 144 which are not connected to the circuit substrate 155a are specific examples of self-heating circuit elements in the present invention, and as shown in FIGS. 8 and 9, they are contained with their respective terminals 141a to 144a connected to a circuit substrate 164 fixed to the inner wall (wall surface) 160e of a heat generating element containing portion 160.

That is, on the inner wall 160e opposed to the top plate 160d of the heat generating element containing portion 160, a flat mounting plate 162 is disposed with its area of contact with the inner wall 160e made large so as to cover a substantially half area of the inner wall 160e. This mounting plate 162 is formed of a metallic material of high heat conductivity such as aluminum and is fixed to the inner wall 160e by fixing screws 162a.

The FETs 141 to 144 are formed with threaded holes in which fixing screws 165 are inserted, and by these fixing screws 165 being screwed into the mounting plate 162, the FETs are integrally fixed to the mounting plate 162. The circuit substrate 164 is connected to the FET gate drive circuit 135, etc. of a circuit substrate 155a contained in a sensor cover 155.

According to the electric power steering apparatus of the above-described construction, the control circuit 130 processes in accordance with a predetermined program based on the torque detection signal of the torque sensor 105 and the vehicle speed detection signal from the vehicle speed sensor 123, and based on the result of this processing, the motor drive circuit 131 effects the drive control of the motor 117. By the driving of this motor 117, an auxiliary steering torque is transmitted to the output shaft 103 through the reduction gear 115 and therefore, the steering operation becomes easy, for example, during low speed cornering and during parking (e.g. in a garage).

Also, in the present embodiment, the controller 120 provided with the control circuit 130, the motor drive circuit 131, the current detecting circuit 132 and the clutch drive circuit 133 is disposed on the outer periphery of the gear housing 150 and therefore, the wiring among the circuits becomes simple and the influence of noise is prevented and reliability is improved, but there is the problem of thermal influence of the self-heating FETs 141 to 144 in the motor drive circuit 131 upon the remaining circuit elements. In the present embodiment, however, only the FETs 141 to 144 are contained in the containing chamber 160c of the heat generating element containing portion 160 provided around the gear housing 150 and therefore, no thermal influence is imparted to the other circuit elements constituting the control circuit 130, the current detecting circuit 132, the clutch drive circuit 133 and the motor drive circuit 131.

Since the FETs 141 to 144 are integrally fixed to the inner wall 160 through the mounting plate 162 of high heat conductivity, the quantity of heat generated by these FETs 141 to 144 is positively transferred to the gear housing 150 of large heat capacity through the mounting plate 162, whereby the excessive temperature rise of the FETs 141 to 144 themselves is prevented. Also, the gear housing 150 to which the quantity of heat is transferred from the FETs 141 to 144 has a large area of contact with the atmosphere and therefore efficiently radiates the quantity of heat to the atmosphere.

Thus, according to the present embodiment, the circuit characteristic can be maintained normal and the current value supplied to the motor 117 can be set to a predetermined value without any thermal influence being imparted to the self-heating FETs 141 to 144 and other circuit elements constituting the controller 120 and therefore, there can be provided an electrically operated power steering apparatus of high reliability.

While in the present embodiment, the mounting plate 162 of high heat conductivity is disposed between the FETs 141 to 144 and the inner wall 160e, this is not restrictive, but an operational effect similar to that of the above-described embodiment can be obtained even if the FETs 141 to 144 are directly fixed to the inner wall 160e.

While the FETs 141 to 144 have been described as self-heating circuit elements, this is not restrictive, but a similar operational effect can be obtained even if, for example, the self-heating fail relay 136, the current detecting resistors $R_L$, $R_R$ and the boost voltage source 137 or the charging and discharging capacitor 138 are contained in other heat generating element containing portions.

Also, in the present embodiment, the FETs 141 to 144 are integrally fixed to the outer peripheral surface of the gear housing 150, but a similar operational effect can be obtained even if the FETs 141 to 144 are integrally fixed to the inner peripheral surface of the gear housing 150.

While the present embodiment has been described with respect to the structure in which the FETs 141 to 144 are disposed on the gear housing 150, this is not restrictive, but a similar operational effect can be obtained even if the FETs 141 to 144 are integrally fixed to the outer periphery or the like of the column housing 158 or a rack housing, not shown.

As described above, in the electric power steering apparatus of the present embodiment, self-heating ones of the circuit elements constituting the circuits of the control device are integrally fixed to the wall surface of the housing directly or through the mounting plate formed of a material of high heat conductivity and therefore, the quantity of heat generated by the circuit elements is positively transferred to the housing of large heat capacity directly or through the mounting plate and thus, the excessive temperature rise of the self-heating circuit elements themselves can be prevented.

Also, the housing to which the quantity of heat is transferred from the self-heating circuit elements has a large area of contact with the atmosphere and therefore efficiently radiates the quantity of heat to the atmosphere.

Accordingly, the present invention can provide an electric power steering apparatus of high reliability because the circuit characteristic can be maintained normal and the current value supplied to the electric motor can always be set to a predetermined value without any thermal influence being imparted to the self-heating circuit elements and other circuit elements constituting the control device.

Another embodiment of the present invention will hereinafter be described with reference to the drawings.

Figure 11:
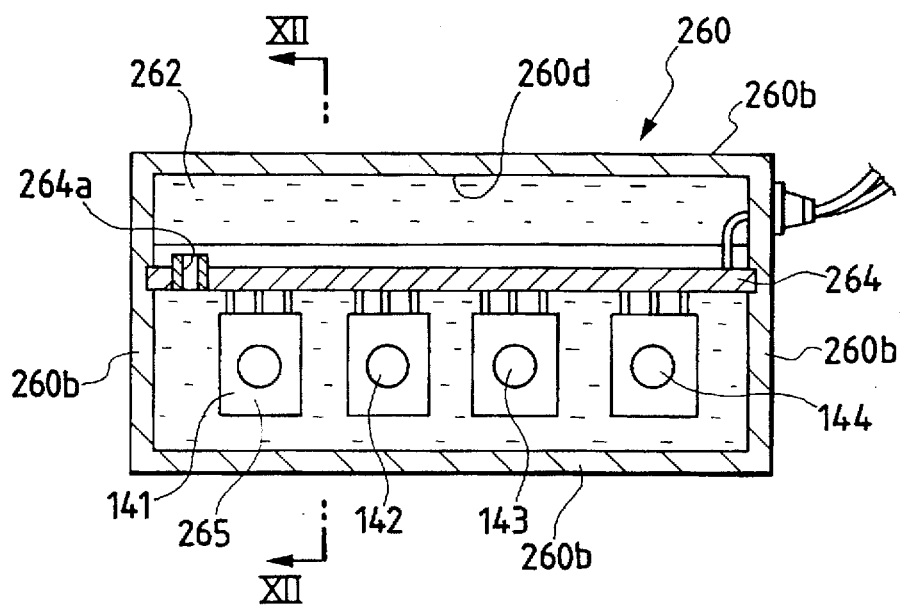
FIG. 11 is a view similar to FIG. 8 but showing a heat generating element containing chamber which is another embodiment of the present invention.
Figure 12:
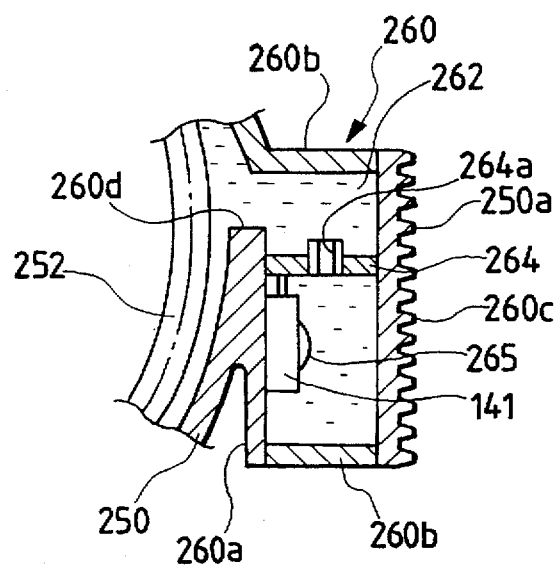
FIG. 12 is a view similar to FIG. 9 but showing the heat generating element of FIG. 11.

A heat generating element containing chamber 260 which is a constituent of the present invention is provided on the outer periphery of a gear housing 250 at a right upper location indicated in FIG. 7. This heat generating element containing chamber 260, as shown in FIGS. 11 and 12, is a containing chamber of liquid-tight structure of which the internal space is defined into a substantially rectangular parallelepiped shape by a bottom plate 260a provided projectedly from the outer periphery of the gear housing 250, a side wall 260b and a top plate 260c provided on the outer periphery of a cooling fin 250a. One end of a communicating portion 260d formed through the peripheral wall of the gear housing 250 opens into the heat generating element containing chamber 260, and the interiors of the heat generating element containing chamber 260 and the gear housing 250 communicate with each other through this communicating portion 260d.

In the present embodiment, lubricating oil 262 is enclosed in the gear housing 250, and a reduction gear 215 and a torque sensor 205 contained in the gear housing 250 are rendered oil-bathed, and lubricating oil 262 is also supplied to the interior of the heat generating element containing chamber 260 communicating with the gear housing 250 through the communicating portion 260d, as shown in FIGS. 11 and 12. The interior of the gear housing 250 is hermetically sealed by seals 251c and 251d.

Further, a circuit substrate 255a constituting a controller 220 is integrally mounted in the mounting portion 250b of the gear housing 250, and all the circuit elements constituting the control circuit 130, the current detecting circuit 132 and the clutch drive circuit 133 shown in FIG. 5 are contained therein, and as regards the motor drive circuit 131, the circuit elements except the four FETs 141 to 144 constituting the H bridge circuit 134 are contained therein.

The FETs 141 to 144 which are not connected to the circuit substrate 255a have their respective terminals connected to a circuit substrate 264 engaged with and fixed to the inner wall of the heat generating element containing chamber 260 as shown in FIGS. 11 and 12, and are contained in a state in which they are fixed to the bottom plate 260a of the heat generating element containing chamber 260 by a fixing member 265. The circuit substrate 264 is connected to the gate drive circuit 135, etc. of the circuit substrate 255a contained in a sensor cover 255. A communicating hole 264a is formed in the front to back direction of the circuit substrate 264. As previously described, by the lubricating oil 262 being enclosed in the gear housing 250, the lubricating oil 262 is also supplied into the heat generating element containing chamber 260 through the communicating portion 260d, but the lubricating oil 262 in the heat generating element containing chamber 260 passes through the communicating hole 264a in the circuit substrate 264 to the whole internal area of the heat generating element containing chamber 260, whereby the FETs 141 to 144 are immersed in the lubricating oil 262.

Figure 13:
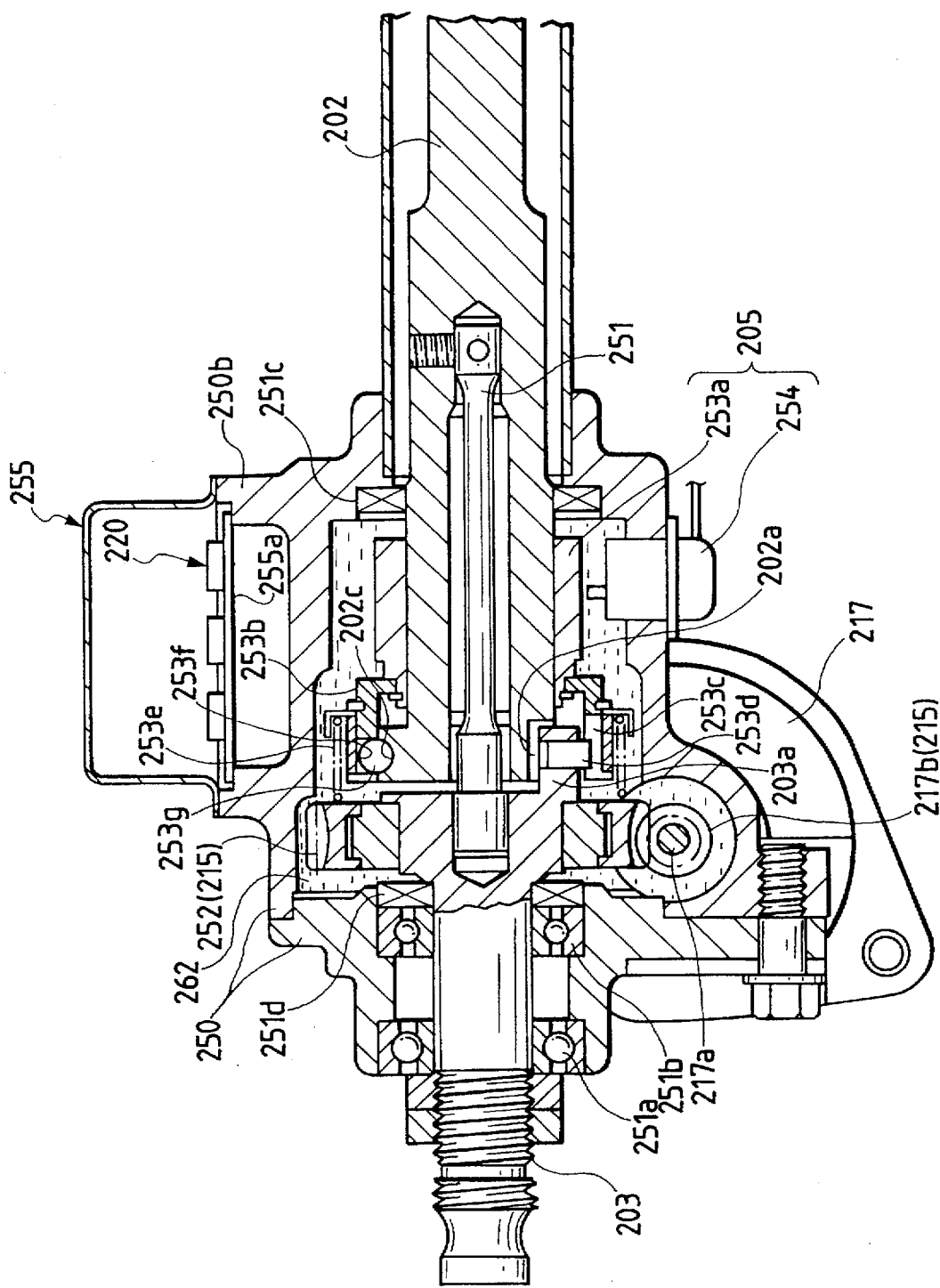
FIG. 13 is a cross-sectional view of principal portions showing the interior of a gear housing according to the present invention.

Also, in the present embodiment, as shown in FIG. 13, the lubricating oil 262 is enclosed in the gear housing 250 and a worm wheel 252 and a worm 217b constituting the reduction gear 215 are rendered oil-bathed, whereby the meshing state of the worm 217b and the worm wheel 252 is always made smooth and therefore, an auxiliary steering force conforming to a steering torque can be reliably transmitted.

Also, since the controller 120 provided with the control circuit 130, the motor drive circuit 131, the current detecting circuit 132 and the clutch drive circuit 133 is integrally disposed in the gear housing 250, the wiring among the circuits becomes simple and the influence of noise is prevented and reliability is improved, but there is the problem of thermal influence on the FETs 141 to 144 which are the heat generating elements of the motor drive circuit 131 and the circuit elements around them caused by the heat generation of the FETs 141 to 144. In the electric power steering apparatus of the present embodiment, however, the lubricating oil 262 enclosed in the gear housing 250 is supplied into the heat generating element containing chamber 260 through the communicating portion 260d and only the FETs 141 to 144 are contained in this heat generating element containing chamber 260 while being immersed in the lubricating oil 262 and therefore, the influence of heat generation is not imparted to the other circuit elements constituting the control circuit 130, the current detecting circuit 132, the clutch drive circuit 133 and the motor drive circuit 131. The quantity of heat generated by the FETs 141 to 144 contacts with the lubricating oil 262 of large heat capacity and is thereby positively radiated to the lubricating oil 262 and therefore, the excessive temperature rise of the FETs 141 to 144 can be prevented. Accordingly, the current value supplied to the motor 217 can always be set to a predetermined value and thus, there can be provided an electric power steering apparatus of high reliability.

Also, the cooling fins 250a are provided on the outer wall of the heat generating element containing chamber 260 and the atmosphere contacts with the cooling fins 250a during the running of the vehicle, whereby the lubricating oil 262 in the heat generating element containing chamber 260 is cooled well and therefore, the heat radiating operation of the FETs 141 to 144 contained in the heat generating element containing chamber 260 can be performed more efficiently.

While in the present embodiment, the FETs 141 to 144 have been described as heat generating elements, this is not restrictive, but a similar operational effect can be obtained even if for example, the fail relay 136, the current detecting resistors $R_L$, $R_R$ and the boost voltage source 137 or the charging and discharging capacitor 138 which may generate heat are individually contained in the heat generating element containing chamber 260.

Also, while the present embodiment has been described with respect to an electric power steering apparatus of the column assist type, this is not restrictive, but a similar operational effect can be obtained even if the present invention is applied to an electric power steering apparatus of the rack and pinion type.

As described above, in the electric power steering apparatus of the present embodiment, the lubricating oil is enclosed in the gear housing and the reduction gear is rendered oil-bathed, and the meshing state of the output shaft and the output shaft of the electric motor with the reduction gear is always made smooth and therefore, it becomes possible to reliably transmit an auxiliary steering force conforming to a steering force to the output shaft and at the same time, the lubricating oil is supplied so as to fill the internal space of the containing chamber, and since the circuit elements of the control device which are great in the quantity of generated heat are contained in this containing chamber while being immersed in the lubricating oil, the influence of the generated heat is not imparted to the other circuit elements of the control device. The quantity of heat of the circuit elements contained in the containing chamber contacts with the lubricating oil of large heat capacity and is thereby positively radiated to the lubricating oil and thus, the excessive temperature rise of the circuit elements can be prevented.

Accordingly, the present invention can always set the current value supplied to the electric motor to a predetermined value and can therefore provide an electric power steering apparatus of high reliability.

Still another embodiment of the present invention will now be described in detail with reference to the drawings.

Figure 14:
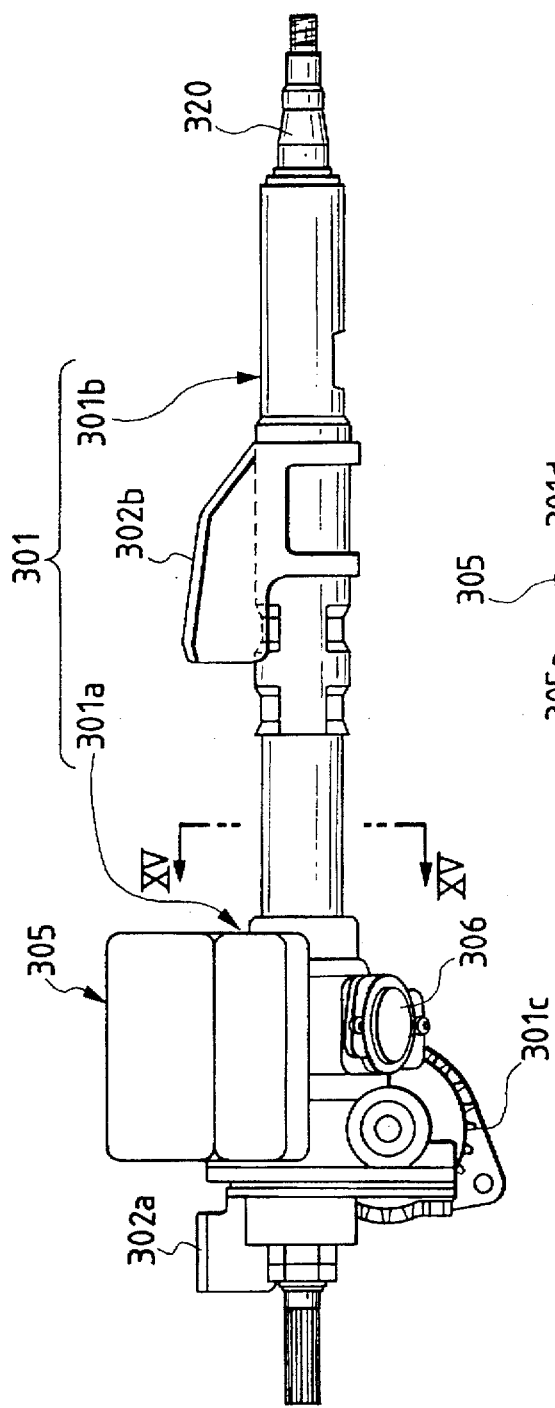
FIG. 14 is a front view of an electric power steering apparatus which is another embodiment of the present invention.
Figure 15:
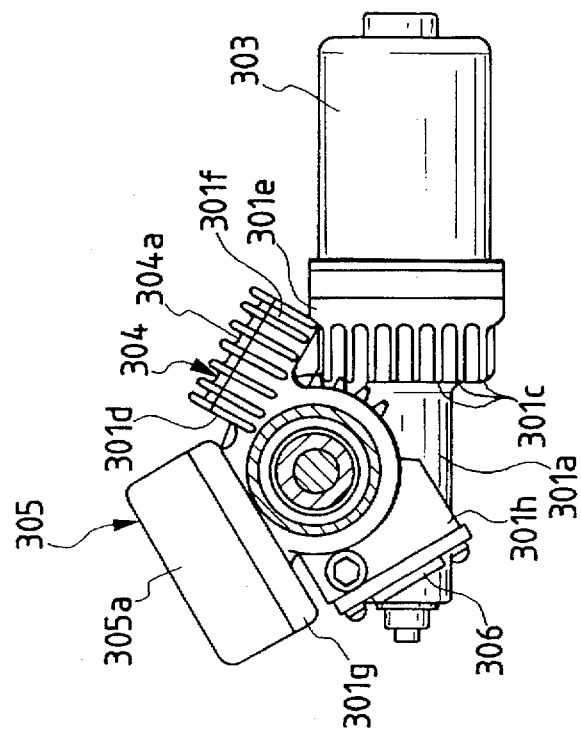
FIG. 15 is a cross-sectional view of the FIG. 14 apparatus taken along the line XV—XV of FIG. 14.

FIG. 14 is a front view of an electric power steering apparatus which is an embodiment of the present invention, and FIG. 15 is a cross-sectional view of the same apparatus taken along the line XV-XV of FIG. 14.

In FIG. 14, a housing 301 comprises a housing body 301a and a tube 301b coupled together. The housing is made of aluminum of high heat radiating property. A steering shaft 320 having one end thereof connected to a steering wheel, not shown, is inserted in the tube 301b. The steering shaft 320 is divided into two portions in the tube 301b, and the two portions are connected together by a torsion bar, not shown. The electric power steering apparatus is adapted to be mounted in a vehicle through a bracket 302b mounted on the center of the tube 301 and a bracket 302a mounted on the housing body 301a.

As shown in FIG. 15, the housing body 301a is formed with a cylindrical boss 301e for an electric motor 303, a box-like boss 301f for a driver 304, a box-like boss 301g for a controller 305, and a cylindrical boss 301h for a potentiometer 306 which is a detector. The electric motor 303 is mounted on the cylindrical boss 301e, and the potentiometer 306 is mounted on the cylindrical boss 301h. The circuit (not shown) of the driver 304 is contained in the box-like boss 301f and has its upper portion covered with a cover 304a. Also, the circuit (not shown) of the controller 305 is contained in the box-like boss 301g and has its upper portion covered with a cover 305a.

In the present embodiment, the driver 304 and the controller 305 together constitute drive means. The potentiometer 306 is adapted to measure the angle of torsion of the torsion bar twisted by a steering torque applied to the steering shaft 320 which has been converted into an axial amount, convert it into an electrical signal and output it. Such a construction using the torsion bar is known, for example, in Japanese Laid-Open Utility Model Application No. 60-17944 and consequently need not be described in detail herein.

The controller 305 is adapted to receive the electrical signal from the potentiometer 306 and further receive a vehicle speed signal or the like from a vehicle speed sensor, not shown, calculate the optimum value of an auxiliary steering force outputted from the electric motor 303 and output it as a control signal.

The driver 304 is adapted to receive the control signal from the controller 305, transmit electric power to the electric motor 303 based on the control signal and generate an appropriate auxiliary steering force from the electric motor.

Now, in the prior art, the driver and the controller together have constituted a control circuit and have been provided in spaced apart relationship with the electric motor. However, a harness for connecting such control circuit and motor together was long, and this led to a current loss problem current loss. On the other hand, the controller has the characteristic of being relatively vulnerable to heat and therefore, if control means is simply mounted in the housing body to shorten the harness, there may arise another problem that the controller will be affected by the heat from the electric motor. Contrastingly, in the present embodiment, the driver 304 and the controller 305 are made discrete from each other and the controller 305 is spaced apart from the electric motor 303.

Also, in addition to the electric motor, the driver 304 having a resistor incorporated therein generates a great quantity of heat during operation. On the other hand, as described above, both of the controller 305 and the potentiometer 306 are parts which are vulnerable to heat. Particularly the potentiometer 306 has the possibility that when it receives heat, the zero point of a detection torque will deviate and it will become impossible to generate an appropriate auxiliary steering force.

In order to eliminate such inconveniences, in the present embodiment, a fin portion 301c forming a row in the circumferential direction of the electric motor 303 is formed on the boss 301e which is the mounting portion for the electric motor 303 in the housing body 301a. Also, the housing body 301a has a fin portion 301d formed on the boss 301f which is a mounting portion for the driver 304 and the cover 304a. These fin portions 301c and 301d have the function of effectively radiating the heat generated by the electric motor 303 and the driver 304 to the atmosphere. By this construction, the influence of heat on the controller 305 and the potentiometer 306 can be suppressed.

Further, as is apparent in FIG. 15, the electric motor 303 and the driver 304 are disposed adjacent to each other, while the controller 305 and the potentiometer 306 are provided on the side opposite to the electric motor 303 and the driver 304 with the axis of the steering shaft interposed therebetween and thus, the potentiometer 306 is most spaced apart from the heat source. By this construction, the heat transfer to the controller 305 and the potentiometer 306 may be further suppressed. The boss 301g for the controller has some heat radiating surface and consequently can further reduce the influence of heat on the potentiometer 306.

The operation of the electric power steering apparatus which is the present embodiment will now be described with reference to FIG. 14. When the driver rotates a steering wheel, not shown, the steering shaft 320 is rotated and a torque is transmitted to a rack shaft, not shown. In this case, the value of the torque detected by the potentiometer 306 is sent to the controller 305, in which an auxiliary steering command value conforming to the torque detection value and the vehicle speed is generated to. In order to drive the electric motor 303 based on the auxiliary steering command value, a driving command is outputted to the driver 304. The electric motor 303 driven by the driver 304 based on the driving command drives the steering shaft 320 through a reduction mechanism, not shown, to thereby move the rack shaft in the axial direction thereof. When the value of the torque detected by the potentiometer 306 is lower than a predetermined value, an auxiliary steering force is unnecessary and therefore, the electric motor 303 is not driven.

While the present invention has hitherto been described with respect to an embodiment thereof, the present invention is not restricted to the above-described embodiment, but of course, suitable changes and improvements are possible. For example, the shape of the fin portion is straight with the casting thereof taken into account, but may be curved, and need not be formed integrally with the housing body, but may be discrete from the housing body. Further, the present embodiment is a power steering apparatus of the column assist type, but the present invention is also applicable to a power steering apparatus of the pinion assist type or a power steering apparatus of the ball screw type.

As described above, according to the electric power steering apparatus of the present invention, the heat radiating fin formed on the housing radiates the heat generated from the motor and drive means and minimizes the quantity of heat transferred to the detector through the housing, whereby the influence of the heat on the detector may be eliminated.

Yet still another embodiment of the present invention will hereinafter be described in detail with reference to the drawings.

Figure 16:
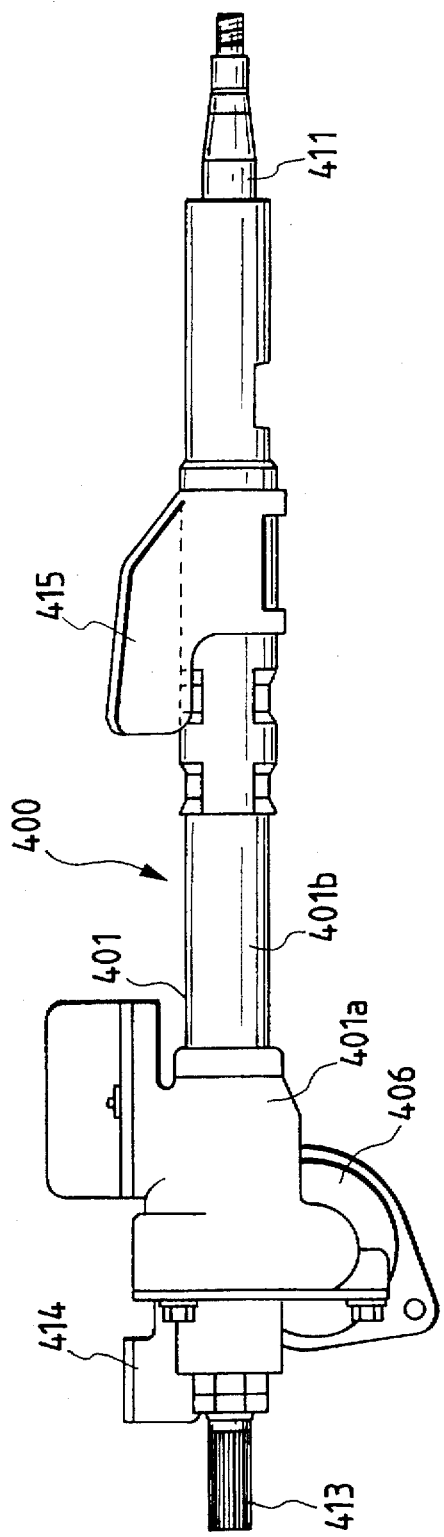
FIG. 16 is a front view of an electric power steering apparatus which is still another embodiment of the present invention.
Figure 17:
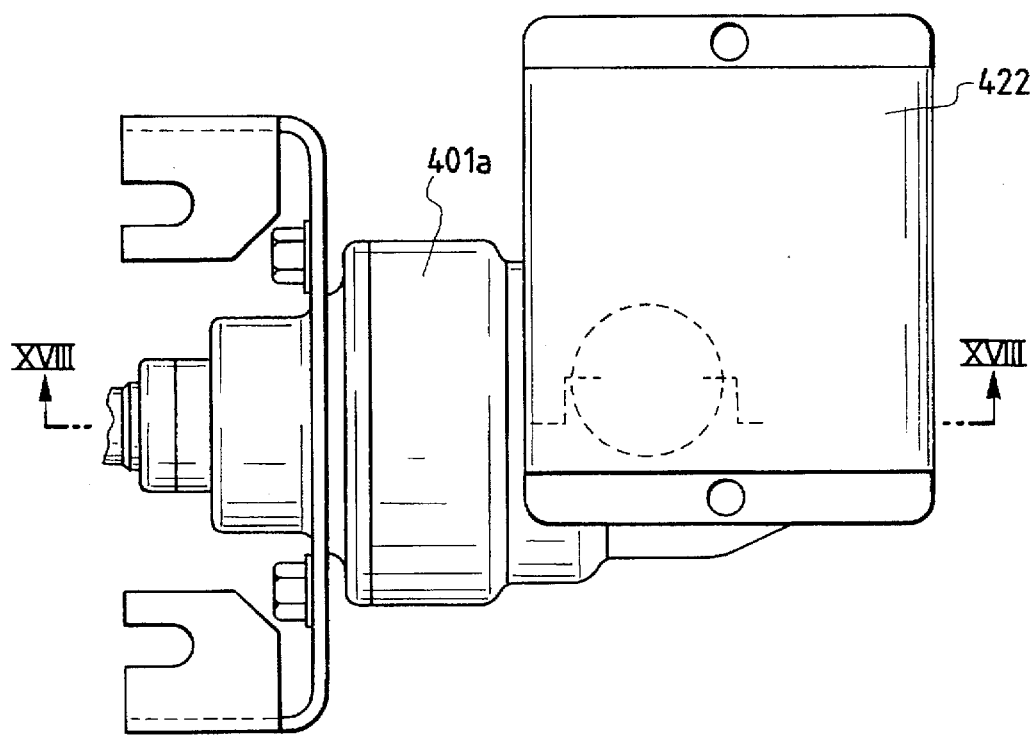
FIG. 17 is an enlarged view of the principal portions of the FIG. 16 apparatus.
Figure 18:
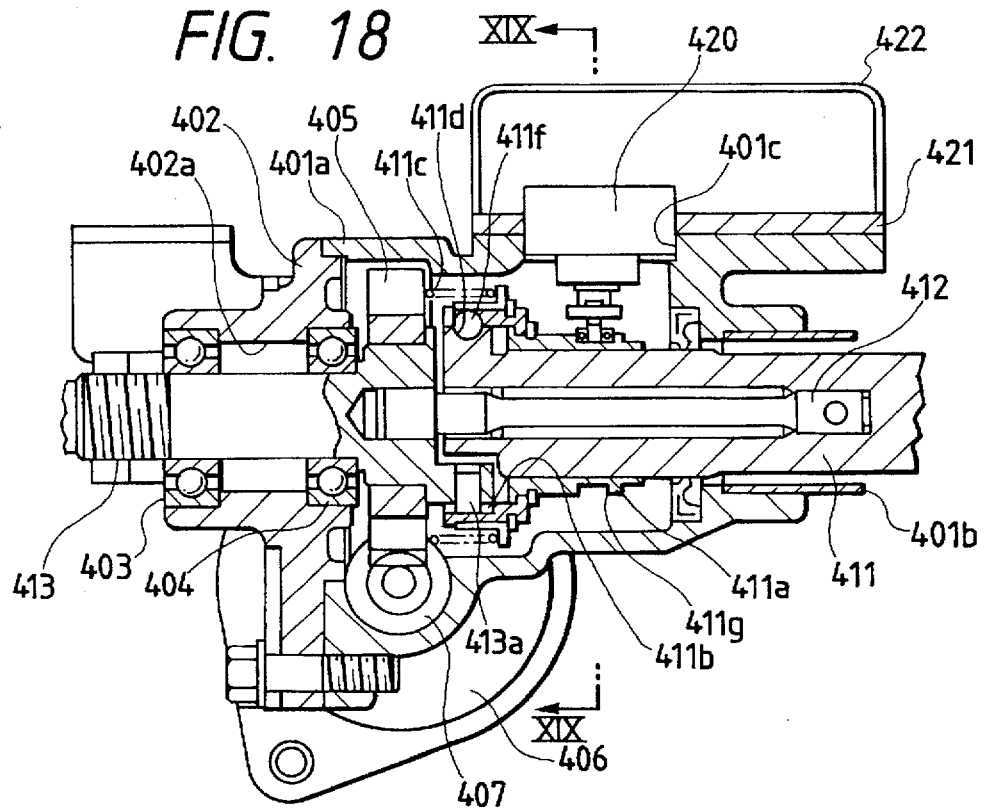
FIG. 18 is a cross-sectional view of the FIG. 17 apparatus taken along the line XVIII—XVIII of FIG. 17.
Figure 19:
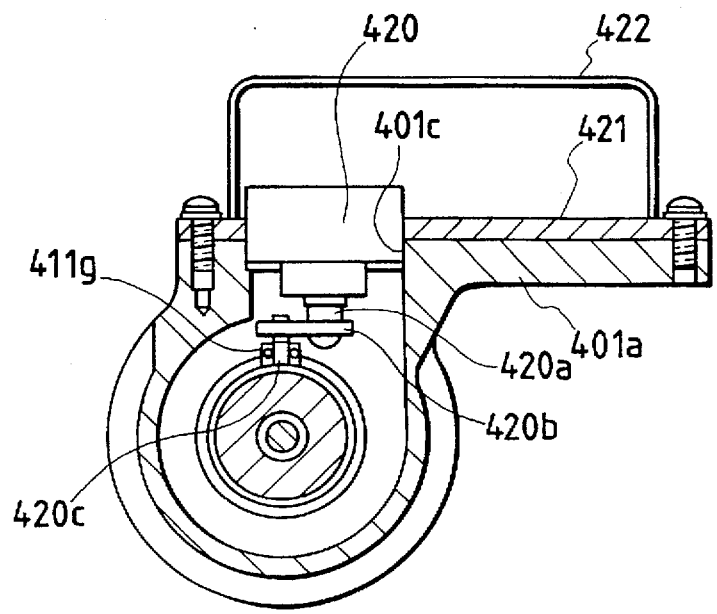
FIG. 19 is a cross-sectional view of the FIG. 18 apparatus taken along the line XIX—XIX of FIG. 18.

FIG. 16 is a front view of an electric power steering apparatus which is an embodiment of the present invention. FIG. 17 is an enlarged cross-sectional view of the principal portions of the FIG. 16 apparatus. FIG. 18 is a cross-sectional view of the same apparatus taken along the line XVIII—XVIII of FIG. 17. FIG. 19 is a cross-sectional view of the same apparatus taken along the line XIX—XIX of FIG. 18.

In FIG. 16, a housing 401 comprises a housing body 401a and a tube 401b coupled together. An input shaft 411 having one end thereof connected to a steering wheel, not shown, is inserted in the tube 401b. The input shaft 411 is connected to an output shaft 413 by a torsion bar 412 (FIG. 18) in the housing body 401a. The electric power steering apparatus 400 is adapted to be mounted in a vehicle through a bracket 415 mounted on the center of the tube 401b and a bracket 414 mounted on the housing body 401a.

In FIG. 18, one end of the housing body 401a is closed by a housing cover 402, and the output shaft 413 connected to the input shaft 411 through the torsion bar 412 is inserted in an opening 402a formed in the housing cover 402. The output shaft 413 is supported for rotation relative to the housing cover 402 by bearings 403 and 404. A pinion shaft (not shown) constituting, for example, a conventional rack pinion type steering apparatus is connected to the left end portion of the output shaft 413. Accordingly, a steering torque generated by the driver steering the steering wheel may be transmitted to a turning wheel, not shown, through the input shaft 411, the torsion bar 412, the output shaft 413 and the rack and pinion type steering apparatus.

A worm wheel 405 coaxial and rotatable with the output shaft 413 is fitted near the right end of the output shaft 413 and is in meshing engagement with a worm 407 formed on the rotary shaft of an electric motor 406. Further, a pin 413a is forced into the right end portion of the output shaft 413 so as to protrude diametrally outwardly thereof. The outer end portion of this pin 413a is inserted in a longitudinal groove 411b formed in a slider 411a (comprising three tubes) fitted for displacement in the axial direction and the direction of rotation relative to the input shaft 411 and having a width somewhat greater than that of the pin 413a. Accordingly, the output shaft 413 and the slider 411a are integral with each other in the direction of rotation, but is relatively displaceable in the axial direction within the range of the length of the longitudinal groove 411b.

The slider 411a is normally biased rightwardly from the worm wheel 405 as viewed in FIG. 18 by a spring 411c. A spiral groove 411d inclined with respect to the input shaft is formed in the outer peripheral surface of the input shaft 411, and a ball 411f made of steel is rollably contained in the spiral groove 411d. A groove 411g extending over the entire circumference of the slider 411a is formed in the outer periphery of the slider 411a.

In FIGS. 18 and 19, an opening 401c is formed in the upper portion of the housing 401a, and a potentiometer 420 which is a detector is fitted in the opening 401c. The potentiometer 420 is integrally mounted on a support plate 421 for ECU 422 which is control means. Although not shown in FIGS. 18 and 19, a circuit for appropriately controlling the motor 406 based on a vehicle speed and a steering torque is provided in the ECU 422. The power supply cord and signal line, not shown, of the potentiometer 420 are directly connected to the substrate of this circuit.

The potentiometer 420 has a rotary shaft 420a having an arm 420b mounted at one end thereof. A projection 420c is mounted on the other end of the arm 420b, and the tip end of the projection 420c is rotatably mounted in a groove 411g in the outer periphery of the slider 411a through a bearing. By this construction, the arm 420b and the rotary shaft 420 may be rotated with the movement of the slider 411. The potentiometer 420 is designed to output an electrical signal of an amount conforming to the angle of rotation of the rotary shaft 420a.

The operation of the present embodiment will hereinafter be described with reference to the drawings. Assuming that the vehicle is in its rectilinearly running state and no steering torque is created, no relative rotation occurs between the input shaft 411 and the output shaft 413 and therefore, no axial force is created in the slider 411a. Accordingly, in this case, the ECU judges that no steering torque is created in the steering system, and does not send a driving signal to the electric motor 406. Consequently, no auxiliary steering torque is applied to the output shaft 413.

Next, when the steering wheel is steered and a rotational force is created in the input shaft 411, the rotational force is transmitted to the output shaft 413 through the torsion bar 412. At this time, a reaction force or the like the turning wheel receives from the road surface is created in the output shaft 413 and therefore, the torsion bar 412 is twisted between the input shaft 411 and the output shaft 413, whereby relative rotation by which the output shaft 413 is delayed is created.

The ball 411f is rollably contained in the slider 411a integral with the output shaft 413 in the direction of rotation and the spiral groove 411d of the input shaft 411 and therefore, when relative rotation occurs between the input shaft 411 and the slider 411a, the slider 411a moves in the axial direction thereof in accordance with the angle of inclination of the spiral groove 411d. If the slider 411a moves in the axial direction thereof in conformity with the relative rotation between the input shaft 411 and the output shaft 413, the arm 420b of the potentiometer 420 pivotally moves by an amount corresponding to the amount of movement of the slider and an electric signal of an amount corresponding to the amount of pivotal movement is outputted from the potentiometer 420. The ECU 422 receives as an input the output signal from the potentiometer 420, converts it into the amount of torque between the input shaft 411 and the output shaft 413, and outputs an appropriate driving signal to the electric motor 406.

According to the present embodiment, the potentiometer 420 and the ECU 422 are formed integrally with each other and therefore, an intermediate harness or the like connecting the two together becomes unnecessary and thus, the number of the parts of the apparatus and the number of assembling steps can be curtailed. Also, the inconvenience that a tool collides with the harness during assemblage to thereby break the harness is eliminated.

Figure 20:
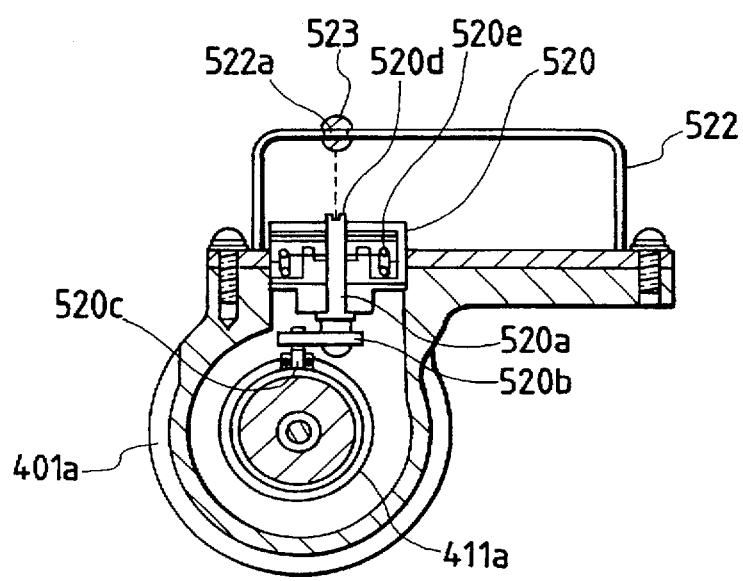
FIG. 20 is a cross-sectional view similar to FIG. 19 but showing yet still another embodiment of the present invention.

FIG. 20 is a cross-sectional view similar to FIG. 19 but showing a further embodiment of the present invention. This embodiment will be described with respect to only the differences thereof from the previous embodiment. In FIG. 20, a potentiometer 520 is also shown in cross-section. The rotary shaft 520a of the potentiometer 520 has its upper portion protruded to the upper surface of the potentiometer, and the upper surface thereof is formed with a recess 520d into which the tip of a tool such as a screw driver can be inserted. The potentiometer 520 contains a spring 520e therein, and the spring 520e biases the rotary shaft 520a in one direction of rotation.

On the other hand, an opening 522a is formed in that portion of the upper surface of a case for ECU 522 which is on the extension of the rotary shaft 520a, and a dustproof lid member 523 closes the opening 522a.

Since as described above, the rotary shaft 520a is biased in one direction of rotation, the potentiometer 520 in its free state is such that usually the position of a projection 520c at the tip end of an arm 520b deviates greatly from the original mounted position. Heretofore, when the potentiometer is to be assembled to the apparatus, the body thereof has been rotated greatly to thereby insert the projection into a groove 411g in the slider and effect assembly, and after the assembly, the potentiometer has been further rotated, whereby the electrical neutrality thereof could be achieved. However, if the potentiometer is made integral with the ECU, there will be a case where as in the prior art, the potentiometer, i.e., the ECU, cannot be freely rotated due to the interference of a surrounding part (for example, a gear box). So, if as shown in the present embodiment, a tool is inserted through the opening 522a in the upper surface of the case for the ECU 522 during assembly and only the rotary shaft 520a of the potentiometer 520 is rotated so that the projection thereof can be inserted into the groove in the slider, the assembly of the potentiometer can be accomplished easily.

Figure 21:
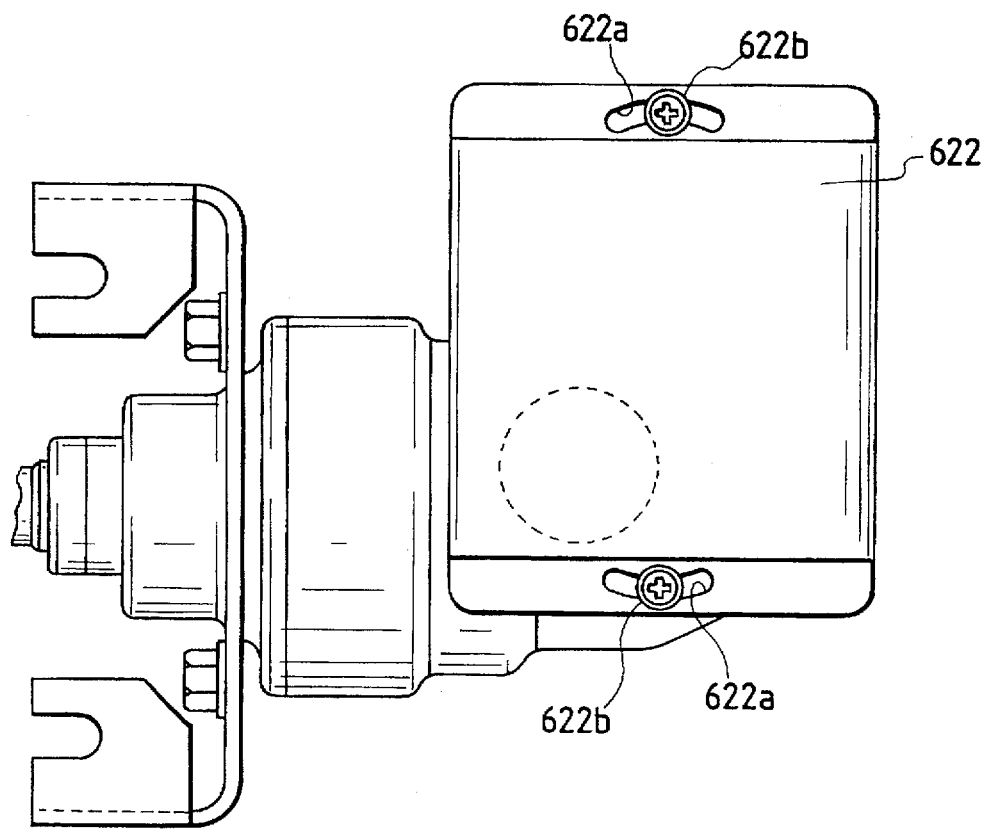
FIG. 21 is a top plan view similar to FIG. 17 but showing a further embodiment of the present invention.

If there is some room between the ECU and the surrounding part, the ECU can be slightly rotated with the potentiometer after assembly to thereby achieve the electrical neutrality of the potentiometer easily. FIG. 21 is a top plan view similar to FIG. 17 but showing still a further embodiment of the present invention. In FIG. 21, slots 622a are formed in the mounting portion of ECU 622, and the ECU 622 is rotated during assembly to effect neutral adjustment, whereafter the ECU 622 may be secured by the use of screws 622b. The slots 622a and the screws 622b together constitute mounting means.

Figure 22:
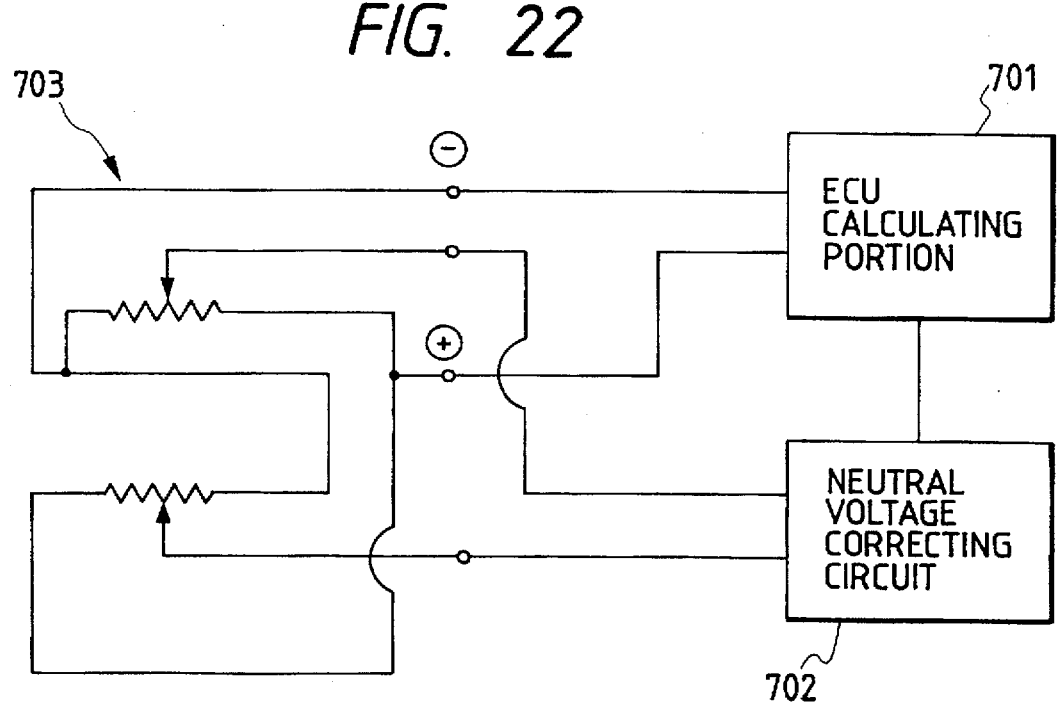
FIG. 22 is a block diagram showing still a further embodiment of the present invention.

FIG. 22 is a block diagram showing yet still a further embodiment of the present invention. An ECU calculating portion 701 and a potentiometer 703 are connected together through a neutral voltage correcting circuit 702 including a variable resistor means. Depending on the environment in which the ECU is mounted, there is a case where as in the previous embodiment, the ECU itself cannot be rotated even somewhat. Since the potentiometer and the ECU are integral with each other, the potentiometer alone cannot be rotated to achieve the electrical neutrality thereof. So, in the present embodiment, the neutral position of steering (zero steering torque) and the zero setting of the potentiometer 703 can be electrically achieved by the neutral voltage correcting circuit 702. Regarding the neutral voltage correcting circuit, the volume thereof is adjustable through an opening (not shown) formed in a case for the ECU. The neutral voltage is achieved by changing the amount of offset. In this case, if the opening is hermetically sealed after neutral adjustment, the neutral adjustment can be prevented from being inadvertently deviated.

According to the electrically operated power steering apparatus of the present invention, the detector is integrally incorporated in the mounting member and therefore, an intermediate harness for connecting the two together can be eliminated, whereby the number of parts and the number of assembling steps can be curtailed. Also, the breakage of the harness caused by a tool inadvertently colliding with the harness during assembly is eliminated and reliability is improved.

What is claimed is:

1. An electric power steering apparatus comprising:

a housing;

a steering torque detector for detecting a steering torque inputted to a steering system;

an electric motor mounted in said housing for imparting an auxiliary steering torque to said steering system through a reduction gear mechanism;

a control circuit disposed in proximity to said electric motor for setting a current value to said electric motor based on a detection signal from said steering torque detector; and a drive circuit for supplying said electric motor with a driving current substantially conforming to said current value;

said control circuit and said drive circuit being integrally disposed on a deformable circuit substrate, said circuit substrate being provided on one of a housing for members constituting said steering system and a housing for said reduction gear mechanism while being deformed so as to cover a portion of an outer surface of said housing along the shape of said outer surface.

2. An electric power steering apparatus comprising:

a housing;

torque detecting means for detecting a steering torque inputted to an input shaft through a steering wheel and generating an output signal, an electric motor mounted in said housing and generating an auxiliary steering torque;

a reduction gear contained in a gear housing for transmitting said auxiliary steering torque to an output shaft; and a control device disposed in proximity to said electric motor for controlling said auxiliary steering torque in substantial conformity with said output signal, wherein lubricating oil is enclosed in said gear housing to thereby render said reduction gear oil-bathed, a containing chamber communicating with the interior of said gear housing and having its internal space filled with said lubricating oil is provided at an outer peripheral position of said gear housing, and a circuit element of said control device which generates substantial heat relative to other circuit elements of said control device is contained in said containing chamber.

3. An electric power steering apparatus comprising:

a housing;

an electric motor mounted in said housing for auxiliarily driving a steering shaft for steering wheels;

control means disposed in proximity to said motor, including a detector having a rotary shaft rotatable in substantial conformity with a torque applied to said steering shaft and for detecting the amount of rotation of said rotary shaft to thereby detect said torque, said control means controlling said motor in substantial conformity with the detected torque; and mounting means for rotatably mounting said control means about the rotary shaft of said detector.

4. The electric power steering apparatus of claim 3, wherein the rotary shaft of said detector is biased in one direction of rotation, and said control means is surrounded by a case which is formed with an opening into which a tool for rotating the rotary shaft of said detector is insertable from outside.

5. The electric power steering apparatus of claim 3, wherein said detector is adapted to produce an electrical signal corresponding to the detected torque, a neutral voltage correcting circuit having variable resistor means for achieving electrical neutrality in said detector is provided between said detector and said control means, said control means is surrounded by a case which is formed with an opening for adjusting said variable resistor means from outside, and said opening is hermetically sealed after the adjustment of said variable resistor means.

* * * * *